(12) United States Patent
Ihara et al.

(10) Patent No.: US 8,148,006 B2
(45) Date of Patent: Apr. 3, 2012

(54) ELECTROLYTIC SOLUTION AND BATTERY

(75) Inventors: Masayuki Ihara, Fukushima (JP);
Takashi Murakami, Fukushima (JP);
Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 988 days.

(21) Appl. No.: 12/123,868

(22) Filed: May 20, 2008

(65) Prior Publication Data

US 2008/0292970 A1      Nov. 27, 2008

(30) Foreign Application Priority Data

May 22, 2007   (JP) ................. 2007-135414

(51) Int. Cl.
*H01M 6/04*     (2006.01)
(52) U.S. Cl. ........ 429/199; 429/200; 429/330; 429/332; 429/327; 429/329; 429/341; 429/342; 429/323; 429/218.1; 429/231.8; 429/233; 252/62.2
(58) Field of Classification Search .................. 429/199, 429/200, 330, 332, 327, 329, 341, 342, 323, 429/218.1, 231.8, 233; 252/62.2
See application file for complete search history.

(56) References Cited

FOREIGN PATENT DOCUMENTS

| | | |
|---|---|---|
| JP | 09-067293 | 3/1997 |
| JP | 2000-243439 A | 9/2000 |
| JP | 2002-280063 | 9/2002 |
| JP | 2004-103372 A | 4/2004 |
| JP | 2004-172101 | 6/2004 |
| JP | 2004-363086 A | 12/2004 |
| JP | 2005-235734 A | 9/2005 |
| JP | 2006-261092 A | 9/2006 |
| JP | 2006-338892 A | 12/2006 |
| JP | 2007-273395 | 10/2007 |

OTHER PUBLICATIONS

Kyung-Il Kim and James R. McCarthy; A New Route to 1,1-Difluoroolefins From Carboxlic Acids; Tetrahedron Letters, vol. 37, No. 19, pp. 3223-3226; 1996.
G.K. Surya Prakash et al.; Difluormethyl Phenyl Sulfone, a Difluormethylidene Equivalent: Use in the Synthesis of 1,1-Difluoro-1-alkenes; Angewandte Chemie International Edition 43 (2004) p. 5203-5206.
G.K. Surya Prakash et al.; Nucleophilic difluoromethylation and difluoromethylenation using bromodifluoromethyl phenyl sulfone; Journal of Fluorine Chemistry; 126 (2005); p. 1361-1367.
Javier Gonzalez et al.; Difluormethylation of Alkenes via Borohydride Reduction of 1,3-Dibromo-1,1-difluoralkenes; Journal of Organic Chemistry; 1991, VIL.5Y; p. 4322-4325.
Japanese Patent Office, Office Action issued in Patent Application JP2007-135414, on Aug. 6, 2009.

*Primary Examiner* — Laura Weiner
(74) *Attorney, Agent, or Firm* — SNR Denton US LLP

(57) ABSTRACT

A battery capable of improving cycle characteristics is provided. A separator arranged between a cathode and an anode is impregnated with an electrolytic solution. The electrolytic solution includes: a solvent; and an electrolytic salt, in which the solvent includes a compound having a difluoroalkene structure. The content of the compound having a difluoroalkene structure in the solvent is within a range from 1 wt % to 5 wt % both inclusive.

20 Claims, 4 Drawing Sheets

ELECTROLYTIC SOLUTION AND BATTERY

CROSS REFERENCES TO RELATED APPLICATIONS

The present invention contains subject matter related to Japanese Patent Application JP 2007-135414 filed in the Japanese Patent Office on May 22, 2007, the entire contents of which being incorporated herein by reference.

BACKGROUND OF THE INVENTION

1. Field of the Invention

The present invention relates to an electrolytic solution including a solvent and an electrolyte salt and a battery using the electrolytic solution.

2. Description of the Related Art

In recent years, portable electronic devices such as camera-integrated VTRs (videotape recorders), cellular phones, or laptop computers are widely used, and size and weight reduction in the portable electronic devices and an increase in longevity of the portable electronic devices have been strongly demanded. Accordingly, as power sources for the portable electronic devices, the development of batteries, specifically lightweight secondary batteries capable of obtaining a high energy density have been promoted. Among them, a secondary battery (a so-called lithium-ion secondary battery) using insertion and extraction of lithium for charge-discharge reaction, a secondary battery (so-called lithium metal secondary battery) using precipitation and dissolution of lithium, or the like holds great promise, because the secondary batteries are capable of obtaining a large energy density, compared to a lead-acid battery or a nickel-cadmium battery.

As an electrolytic solution for the lithium-ion secondary battery and the lithium metal secondary battery, a combination of a carbonate-based solvent such as propylene carbonate or diethyl carbonate and an electrolyte salt such as lithium hexafluorophosphate is widely used. It is because the combination has high conductivity, and its potential is stable.

In addition, to improve various performance capabilities, some techniques relating to the composition of the electrolytic solution have already been proposed. More specifically, to improve heat stability or the like, a technique of including a sulfonyl imide compound is known (for example, refer to Japanese Unexamined Patent Application Publication No. 2002-280063). Moreover, to improve storage characteristics, a technique of including a compound having a carbon-carbon unsaturated bond and including carbon, fluorine and hydrogen is known (for example, refer to Japanese Unexamined Patent Application Publication No. 2004-172101).

Moreover, as a peripheral technique, a technique of synthesizing various compounds using difluoroolefin as a starting material is known (for example, refer to Japanese Unexamined Patent Application Publication No. H09-067293, Angewandte Chemie International Edition, (Germany), 2004, Vol. 43, p. 5203-5206, and The Journal of Organic Chemistry, (US), 1991, Vol. 56, p. 4322-4325). According to this, a technique of synthesizing difluoroolefin is known (for example, refer to Journal of Fluorine Chemistry, (UK), 2005, Vol. 126, p. 1361-1367 and Tetrahedron Letters, (UK), 1996, Vol. 37, No. 19, p. 3223-3226).

SUMMARY OF THE INVENTION

As recent electronic devices tend to have higher performance and more functions, secondary batteries are frequently charged and discharged, thereby the discharge capacities of the secondary batteries easily decline. Moreover, as the heating values of electronic devices increase because of factors such as enhancement of performance of electronic parts typified by CPUs (central processing units), the secondary batteries are exposed to a high-temperature atmosphere, thereby the discharge capacity retention ratios of the secondary batteries easily decline. Therefore, further improvement in cycle characteristics of secondary batteries in a high-temperature atmosphere is desired.

In view of the foregoing, it is desirable to provide an electrolytic solution capable of improving cycle characteristics, and a battery including the electrolytic solution.

According to an embodiment of the invention, there is provided an electrolytic solution including: a solvent; and an electrolyte salt, in which the solvent includes a compound having a difluoroalkene structure.

According to an embodiment of the invention, there is provided a battery including a cathode, an anode and an electrolytic solution, in which the electrolytic solution includes a solvent and an electrolyte salt, and the solvent includes a compound having a difluoroalkene structure.

The above-described "compound having a difluoroalkene structure" is a generic name for a compound having a structure ($>C=CF_2$) in which two fluorine atoms are bonded to one of a pair of carbon atoms forming an unsaturated bond.

In the electrolytic solution according to the embodiment of the invention, the solvent includes the compound having a difluoroalkene structure, so compared to the case where the solvent does not include the compound, chemical stability is improved. Thereby, in the battery including the electrolytic solution according to the embodiment of the invention, the decomposition of the electrolytic solution is prevented, so cycle characteristics may be improved.

Other and further objects, features and advantages of the invention will appear more fully from the following description.

DETAILED DESCRIPTION OF THE PREFERRED EMBODIMENTS

Figure 1:
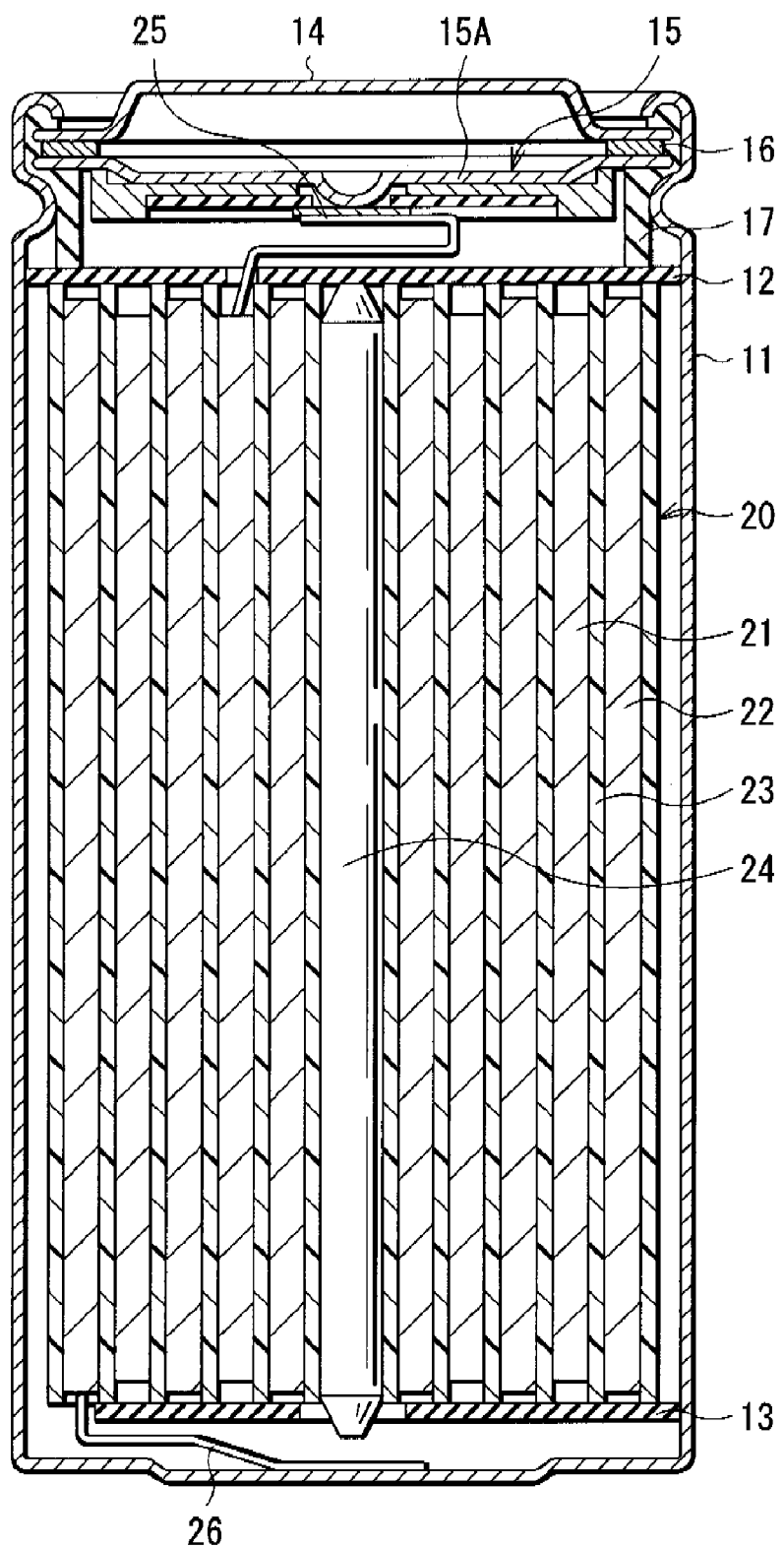
FIG. 1 is a sectional view showing the configuration of a first battery using an electrolytic solution according to an embodiment of the invention.

A preferred embodiment will be described in detail below referring to the accompanying drawings.

An electrolytic solution according to an embodiment of the invention is used in, for example, an electrochemical device such as a battery, and includes a solvent and an electrolyte salt dissolved in the solvent.

The solvent includes a compound having a difluoroalkene structure ($>C=CF_2$), because the chemical stability of the electrolytic solution is improved. As the compound having a difluoroalkene structure, for example, a compound represented by Chemical Formula 1 is cited. It is because sufficient chemical stability is obtained in the electrolytic solution, and sufficient compatibility is obtained.

Chemical Formula 1

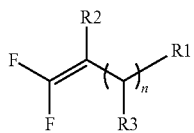

where R1 represents a group including at least one kind selected from the group consisting of an aryl structure, a cycloalkane structure and a heterocyclic structure, R2 represents a hydrogen group, a fluorine group, an alkyl group having 1 to 3 carbon atoms, an aryl group, a fluorinated alkyl group having 1 to 3 carbon atoms or fluorinated aryl group, R1 and R2 may be bonded to form a cyclic structure, R3 represents a hydrogen group or an alkyl group, and n is an integer of 0 to 4.

The "group including at least one kind selected from the group consisting of an aryl structure, a cycloalkane structure and a heterocyclic structure" which describes R1 means a group including at least one kind selected from the group consisting of a benzene ring, a cycloalkane and a heterocycle. In this case, the number of rings of each kind may be one, or two or more, and the number of rings of each kind is freely settable. R1 may be an aryl group, a cycloalkyl group or a heterocyclic group, or a derivative thereof. Moreover, rings of each kind may be bonded directly or indirectly. Such a bonding state of the benzene rings will be described below as an example. In the case where two benzene rings are included, the benzene rings may form a naphthalene type structure in which the benzene rings are directly bonded or a biphenyl type structure in which the benzene rings are indirectly bonded.

The meaning of "a fluorinated alkyl group or a fluorinated aryl group" which describes R2 is an alkyl group or an aryl group in which a fluorine group is substituted for at least a part of a hydrogen group. In the case where R2 is an alkyl group or a fluorinated alkyl group, the number of carbon atoms is 1 to 3, because sufficient compatibility is obtained.

In the case where a plurality of groups represented by R3 are included, they may be the same as or different from one another.

Examples of the compound represented by Chemical Formula 1 include compounds represented by Chemical Formulas 2(1) to 2(12), Chemical Formulas 3(1) to 3(12), Chemical Formulas 4(1) to 4(11) and Chemical Formulas 5(1) to 5(11). Only one kind or a mixture of a plurality of kinds selected from them may be used. Among them, the compounds represented by Chemical Formula 2(1) to 2(4) are preferable, because they are easily available, and a sufficient effect may be obtained.

Chemical Formula 2

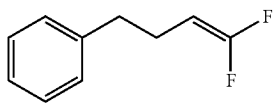

(1)

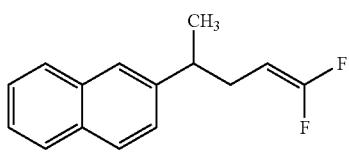

(2)

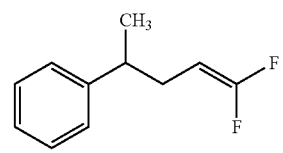

(3)

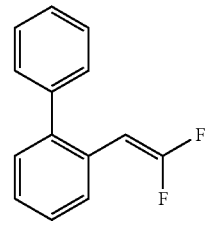

(4)

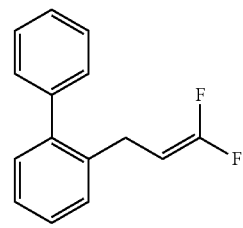

(5)

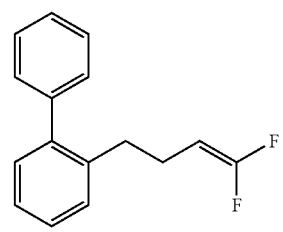

(6)

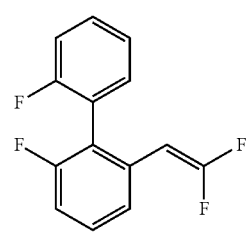

(7)

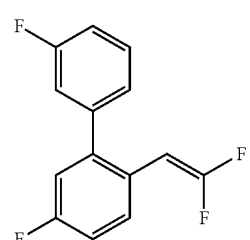

(8)

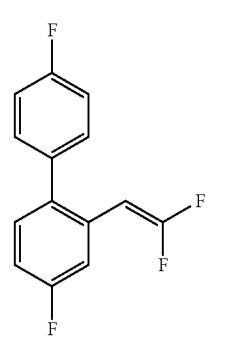

(9)

(10) 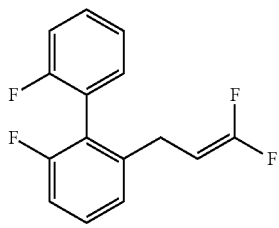
(11) 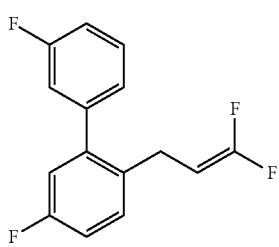
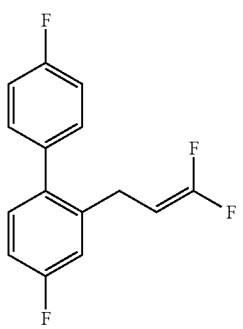
Chemical Formula 3
(1) 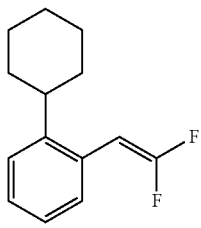
(2) 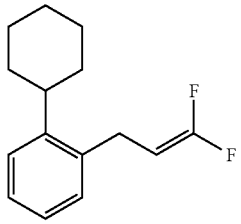
(3) 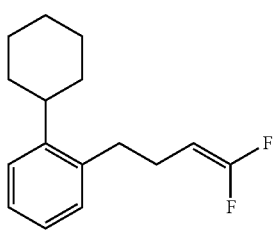
(4) 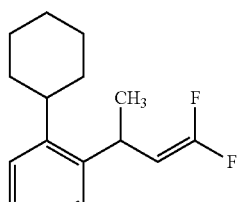
(5) 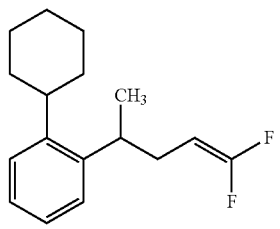
(6) 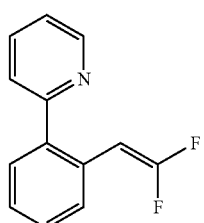
(7) 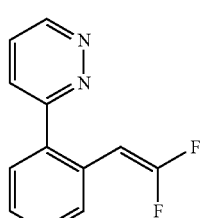
(8) 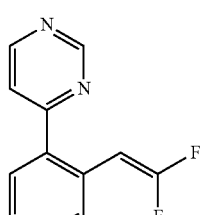
(9) 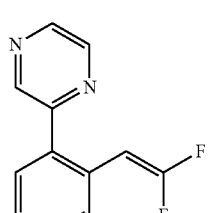
(10) 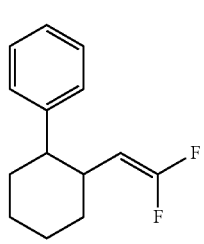

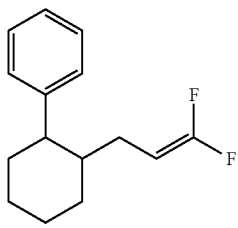
(11)
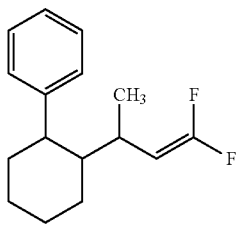
(12)
Chemical Formula 4
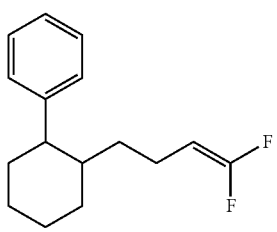
(1)
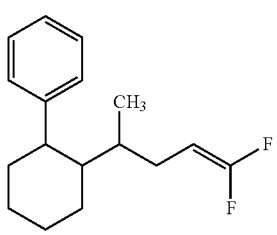
(2)
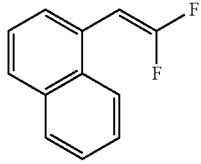
(3)
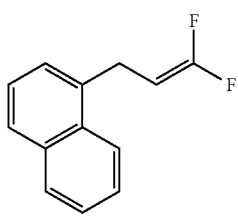
(4)
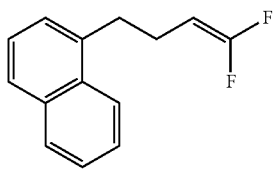
(5)
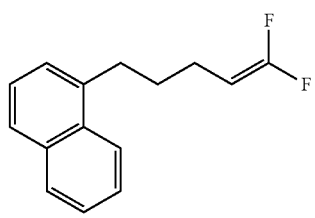
(6)
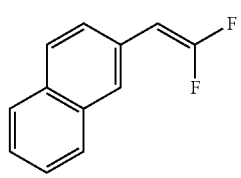
(7)
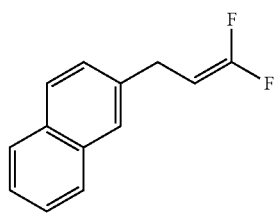
(8)
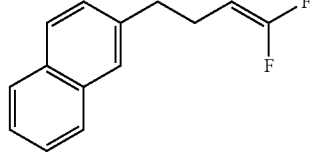
(9)
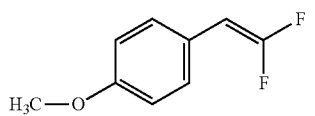
(10)
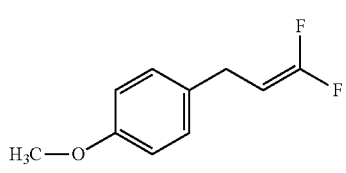
(11)
Chemical Formula 5
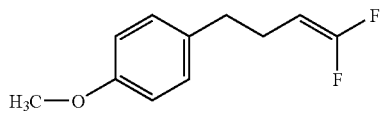
(1)
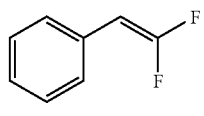
(2)
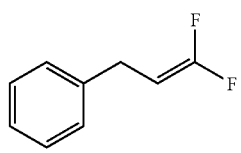
(3)

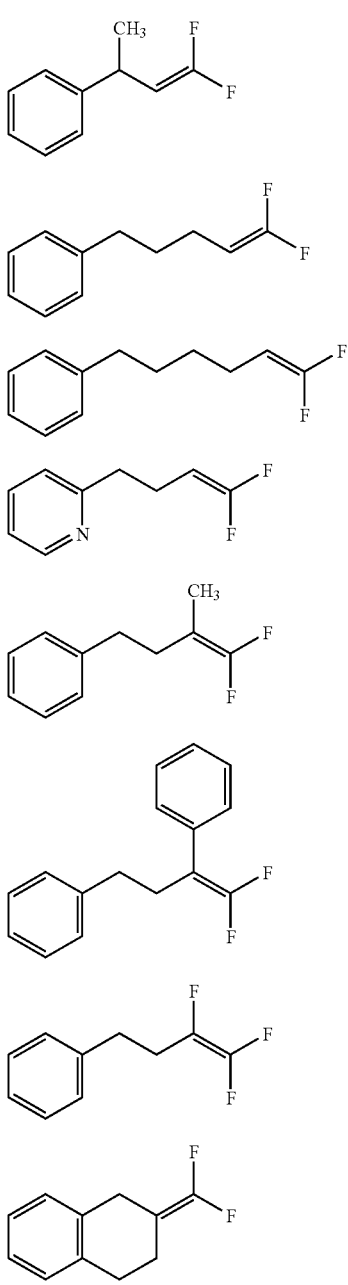

As long as the compound has a composition shown in Chemical Formula 1, the compound is not limited to the compounds represented by Chemical Formulas 2(1) to 5(11). Moreover, as long as the compound has a difluoroalkene structure, the compound is not limited to the compound represented by Chemical Formula 1.

The content of the compound having a difluoroalkene structure in the solvent is freely settable; however, the content is preferably within a range from 0.01 wt % to 5 wt % both inclusive. It is because in the electrolytic solution, sufficient electrochemical stability is obtained, and the performance of an electrochemical device using the electrolytic solution is secured. More specifically, when the content is less than 0.01 wt %, there is a possibility that electrochemical stability is not obtained sufficiently and stably, and when the content is more than 5 wt %, there is a possibility that main electrical performance of the electrochemical device (for example, capacity characteristics in a battery) is not obtained sufficiently. In particular, the above-described content is more preferably within a range from 1 wt % to 5 wt % both inclusive. It is because electrochemical stability is further improved.

The solvent preferably includes a nonaqueous solvent such as other organic solvents in addition to the compound having a difluoroalkene structure. Examples of the nonaqueous solvent include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethyl imidazolidinone, nitromethane, nitroethane, sulfolane, trimethyl phosphate, dimethyl sulfoxide, dimethyl sulfoxide phosphate and the like. Only one kind or a mixture of a plurality of kinds selected from them may be used. Among them, at least one kind selected from the group consisting of ethylene carbonate, propylene carbonate, dimethyl carbonate, diethyl carbonate and ethyl methyl carbonate is preferable, and a combination of a high-viscosity (high-permittivity) solvent, (for example relative permittivity $\epsilon \geq 30$) such as ethylene carbonate or propylene carbonate and a low-viscosity solvent (for example, viscosity$\leq 1$ mPa·s) such as dimethyl carbonate, ethyl methyl carbonate or diethyl carbonate is more preferable. It is because the dissociation property of the electrolyte salt and ion mobility are improved.

Moreover, the solvent preferably includes a cyclic carbonate including an unsaturated bond, because the chemical stability of the electrolytic solution is further improved. The content of the cyclic carbonate including an unsaturated bond in the solvent is preferably within a range from 0.01 wt % to 5 wt % both inclusive, because a sufficient effect may be obtained. As the cyclic carbonate including an unsaturated bond, for example, at least one kind selected from the group consisting of a vinylene carbonate-based compound, a vinyl ethylene carbonate-based compound and a methylene ethylene carbonate-based compound, or the like is cited.

Examples of the vinylene carbonate-based compound include vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, 4-trifluoromethyl-1,3-dioxol-2-one and the like.

Examples of the vinyl ethylene carbonate-based compound include vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, 4,5-divinyl-1,3-dioxolane-2-one and the like.

Examples of the methylene ethylene carbonate-based compound include 4-methylene-1,3-dioxolane-2-one, 4,4-dimethyl-5-methylene-1,3-dioxolane-2-one, 4,4-diethyl-5-methylene-1,3-dioxolane-2-one and the like.

Only one kind or a mixture of a plurality of kinds selected from them may be used. Among them, vinylene carbonate is preferable, because a sufficient effect may be obtained.

Moreover, the solvent preferably includes at least one kind selected from the group consisting of a chain carbonate represented by Chemical Formula 6 which includes a halogen as an element and a cyclic carbonate represented by Chemical Formula 7 which includes a halogen as an element, because the chemical stability of the electrolytic solution is further improved.

Chemical Formula 6

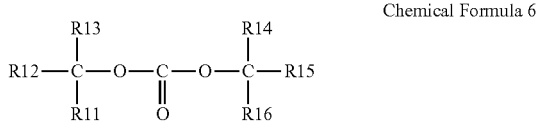

where R11, R12, R13, R14, R15 and R16 each represent a hydrogen group, a halogen group, an alkyl group or a halogenated alkyl group, and at least one of them is a halogen group or a halogenated alkyl group.

Chemical Formula 7

where R21, R22, R23 and R24 each represent a hydrogen group, a halogen group, an alkyl group or a halogenated alkyl group, and at least one of them is a halogen group or a halogenated alkyl group.

R11 to R16 represented by Chemical Formula 6 may be the same as or different from one another. The same holds for R21 to R24 represented by Chemical Formula 7. The "halogenated alkyl group" which describes R11 to R16 or R21 to R24 means an alkyl group in which a halogen group is substituted for at least a part of a hydrogen group. As the halogen group, for example, at least one kind selected from the group consisting of a fluorine group, a chlorine group and a bromine group is cited. Any other halogen group may be used.

Examples of the chain carbonate represented by Chemical Formula 6 which include a halogen include bis(fluoromethyl) carbonate, fluoromethyl methyl carbonate, difluoromethyl methyl carbonate and the like. Only one kind or a mixture of a plurality of kinds selected from them may be used. Among them, at least one kind selected from the group consisting of bis(fluoromethyl)carbonate and fluoromethyl methyl carbonate is preferable, and bis(fluoromethyl)carbonate is more preferable, because a sufficient effect may be obtained.

In the case where at least one of R21 to R24 represented by Chemical Formula 7 is an alkyl group or a halogenated alkyl group, as the groups, a methyl group, an ethyl group, a halogenated methyl group or a halogenated ethyl group is preferable, because a sufficient effect may be obtained.

Examples of the cyclic carbonate represented by Chemical Formula 7 which includes a halogen include compounds represented by Chemical Formulas 8 and 9. More specifically, 4-fluoro-1,3-dioxolane-2-one in Chemical Formula 8(1), 4-chloro-1,3-dioxolane-2-one in Chemical Formula 8(2), 4,5-difluoro-1,3-dioxolane-2-one in Chemical Formula 8(3), tetrafluoro-1,3-dioxolane-2-one in Chemical Formula 8(4), 4-fluoro-5-chloro-1,3-dioxolane-2-one in Chemical Formula 8(5), 4,5-dichloro-1,3-dioxolane-2-one in Chemical Formula 8(6), tetrachloro-1,3-dioxolane-2-one in Chemical Formula 8(7), 4,5-bistrifluoromethyl-1,3-dioxolane-2-one in Chemical Formula 8(8), 4-trifluoromethyl-1,3-dioxolane-2-one in Chemical Formula 8(9), 4,5-difluoro-4,5-dimethyl-1,3-dioxolane-2-one in Chemical Formula 8(10), 4-methyl-5,5-difluoro-1,3-dioxolane-2-one in Chemical Formula 8(11), 4-ethyl-5,5-difluoro-1,3-dioxolane-2-one in Chemical Formula 16(12) and the like are cited. Moreover, 4-trifluoromethyl-5-fluoro-1,3-dioxolane-2-one in Chemical Formula 9(1), 4-trifluoromethyl-5-methyl-1,3-dioxolane-2-one in Chemical Formula 9(2), 4-fluoro-4,5-dimethyl-1,3-dioxolane-2-one in Chemical Formula 9(3), 4,4-difluoro-5-(1,1-difluoroethyl)-1,3-dioxolane-2-one in Chemical Formula 9(4), 4,5-dichloro-4,5-dimethyl-1,3-dioxolane-2-one in Chemical Formula 9(5), 4-ethyl-5-fluoro-1,3-dioxolane-2-one in Chemical Formula 9(6), 4-ethyl-4,5-difluoro-1,3-dioxolane-2-one in Chemical Formula 9(7), 4-ethyl-4,5,5-trifluoro-1,3-dioxolane-2-one in Chemical Formula 9(8), 4-fluoro-4-fluoromethyl-1,3-dioxolane-2-one in Chemical Formula 9(9), 4,5-bistrifluoromethyl-4,5-difluoro-1,3-dioxolane-2-one in Chemical Formula 9(10), 4-bromo-1,3-dioxolane-2-one in Chemical Formula 9(11) and the like are cited. Only one kind or a mixture of a plurality of kinds selected from them may be used. Among them, at least one kind selected from 4-fluoro-1,3-dioxolane-2-one and 4,5-difluoro-1,3-dioxolane-2-one is preferable, and 4,5-difluoro-1,3-dioxolane-2-one is more preferable. It is because they are easily available, and a higher effect may be obtained. In particular, as 4,5-difluoro-1,3-dioxolane-2-one, a trans-isomer is more preferable than a cis-isomer.

Chemical Formula 8

(1)

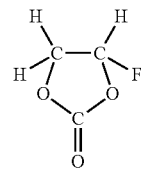

(2)

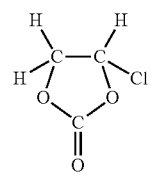

(3)

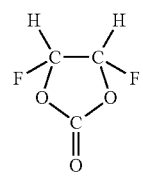

(4)

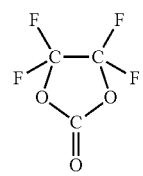

(5)

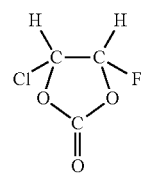

-continued
(6)
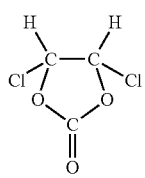
(7)
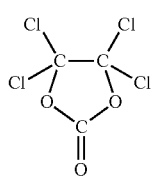
(8)
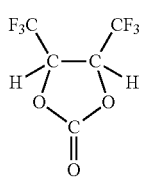
(9)
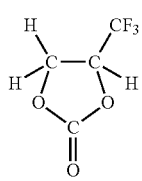
(10)
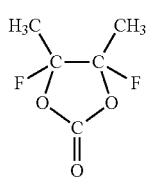
(11)
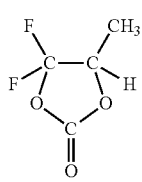
(12)
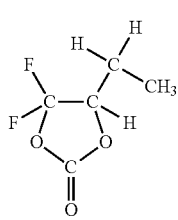
Chemical Formula 9
(1)
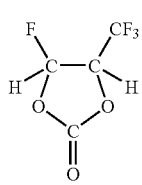
-continued
(2)
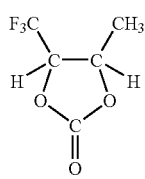
(3)
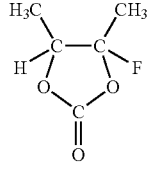
(4)
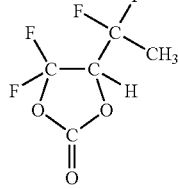
(5)
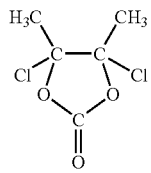
(6)
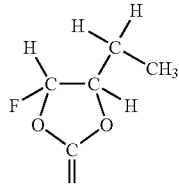
(7)
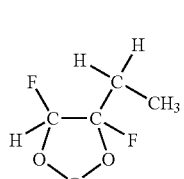
(8)
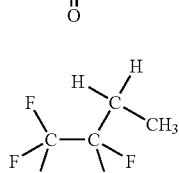
(9)
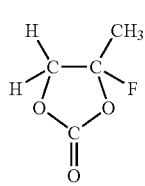

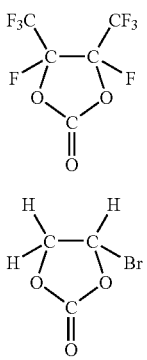

For example, the intrinsic viscosity of the solvent is preferably 10.0 mPa·s or less at 25° C. It is because the dissociation property of the electrolyte salt and ion mobility may be secured. The intrinsic viscosity in a state in which the electrolyte salt is dissolved in the solvent (that is, the intrinsic viscosity of the electrolytic solution) is also preferably 10.0 mPa·s or less at 25° C. because of the same reason.

The electrolyte salt includes one kind or two or more kinds of light metal salts such as a lithium salt. Examples of the lithium salt include lithium hexafluorophosphate, lithium tetrafluoroborate, lithium perchlorate, lithium hexafluoroarsenate, lithium tetraphenyl borate (LiB($C_6H_5$)$_4$), lithium methanesulfonate (LiCH$_3$SO$_3$), lithium trifluoromethanesulfonate (LiCF$_3$SO$_3$), lithium tetrachloroaluminate (LiAlCl$_4$), lithium hexafluorosilicate (Li$_2$SiF$_6$), lithium chloride (LiCl), lithium bromide (LiBr) and the like. Only one kind or a mixture of a plurality of kinds selected from them may be used. Among them, at least one kind selected from the group consisting of lithium hexafluorophosphate, lithium tetrafluoroborate, lithium perchlorate and lithium hexafluoroarsenate is preferable, and in particular, lithium hexafluorophosphate is more preferable, because the resistance of the electrolytic solution declines, so sufficient chemical stability may be obtained.

The electrolyte salt preferably includes at least one kind selected from the group consisting of compounds represented by Chemical Formulas 10, 11 and 12. In the case where they are used with above-described lithium hexafluorophosphate or the like, a higher effect may be obtained. In addition, m and n represented by Chemical Formula 10 may be the same as or different from each other. The same holds for p, q and r represented by Chemical Formula 12.

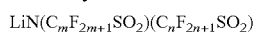

where m and n each are an integer of 1 or more.

Chemical Formula 11

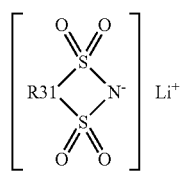

where R31 represents a straight-chain or branched perfluoroalkylene group having 2 to 4 carbon atoms.

where p, q and r each are an integer of 1 or more.

Specific examples of the chain compound represented by Chemical Formula 10 include lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonylo)imide (LiN(CF$_3$SO$_2$)(C$_2$F$_5$SO$_2$)), lithium (trifluoromethanesulfonyl)(heptafluoropropanesulfonyl)imide (LiN(CF$_3$SO$_2$)(C$_3$F$_7$SO$_2$)), lithium (trifluoromethanesulfonyl)(nonafluorobutanesulfonyl)imide (LiN(CF$_3$SO$_2$)(C$_4$F$_9$SO$_2$)) and the like. Only one kind or a mixture of a plurality of kinds selected from them may be used.

Examples of the cyclic compound represented by Chemical Formula 11 include compounds represented by Chemical Formula 13. More specifically, lithium 1,2-perfluoroethanedisulfonylimide in Chemical Formula 13(1), lithium 1,3-perfluoropropanedisulfonylimide in Chemical Formula 13(2), lithium 1,3-perfluorobutanedisulfonylimide in Chemical Formula 13(3), lithium 1,4-perfluorobutanedisulfonylimide in Chemical Formula 13(4) and the like are cited. Only one kind or a mixture of a plurality of kinds selected from them may be used. Among them, lithium 1,3-perfluoropropanedisulfonylimide is preferable, because a sufficient effect may be obtained.

Chemical Formula 13

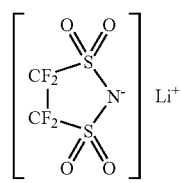

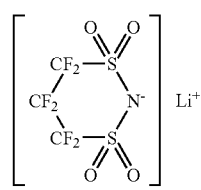

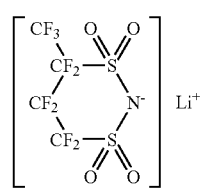

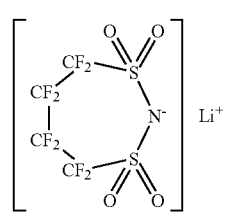

As an example of the chain compound represented by Chemical Formula 12, lithium tris(trisfluoromethanesulfonyl)methide (LiC(CF$_3$SO$_2$)$_3$) or the like is cited.

The content of the electrolyte salt is preferably within a range from 0.3 mol/kg to 3.0 mol/kg both inclusive relative to the solvent. It is because when the content of the electrolyte salt is out of the range, ionic conductivity may be extremely reduced.

In the electrolytic solution, the solvent includes the compound having a difluoroalkene structure such as the compound represented by Chemical Formula 1, so compared to the case where the solvent does not include the compound having a difluoroalkene structure, chemical stability is improved. Thereby, when the electrolytic solution is used for an electrochemical device such as a battery, the decomposition of the electrolytic solution is prevented, so the electrolytic solution is capable of contributing to improvement in cycle characteristics. In this case, when the content of the compound having a difluoroalkene structure in the solvent is within a range from 0.01 wt % to 5 wt % both inclusive, a sufficient effect may be obtained, and when the content is within a range from 1 wt % to 5 wt % both inclusive, a higher effect may be obtained.

In particular, when the solvent includes at least one kind selected from the group consisting of the cyclic carbonate including an unsaturated bond, the chain carbonate represented by Chemical Formula 6 which includes a halogen and the cyclic carbonate represented by Chemical Formula 7 which includes a halogen, a higher effect may be obtained.

Moreover, when the electrolyte salt includes at least one kind selected from the group consisting of the compounds represented by Chemical Formulas 10, 11 and 12, a higher effect may be obtained.

Next, application examples of the above-described electrolytic solution will be described below. As an example of the electrochemical device, a battery is cited, and the electrolytic solution is used in a battery as below.

(First Battery)

FIG. 1 shows a sectional view of a first battery. In this battery, the capacity of an anode is represented by a capacity component based on insertion and extraction of lithium as an electrode reactant, and the battery is a so-called a lithium-ion secondary battery.

The battery includes a spirally wound electrode body 20 which includes a cathode 21 and an anode 22 spirally wound with a separator 23 in between and a pair of insulating plates 12 and 13 in a substantially hollow cylindrical-shaped battery can 11. The battery can 11 is made of, for example, nickel (Ni)-plated iron (Fe). An end portion of the battery can 11 is closed, and the other end portion thereof is opened. The pair of insulating plates 12 and 13 are arranged so that the spirally wound electrode body 20 is sandwiched therebetween, and the pair of insulating plates 12 and 13 extends in a direction perpendicular to a peripheral winding surface. A battery configuration using the battery can 11 is called a so-called cylindrical type.

In the opened end portion of the battery can 11, a battery cover 14, and a safety valve mechanism 15 and a positive temperature coefficient device (PTC device) 16 arranged inside the battery cover 14 are mounted by caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16. In the safety valve mechanism 15, when an internal pressure in the battery increases to a certain extent or higher due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance to prevent abnormal heat generation caused by a large current. The gasket 17 is made of, for example, an insulating material, and its surface is coated with asphalt.

A center pin 24 is inserted into the center of the spirally wound electrode body 20. In the spirally wound electrode body 20, a cathode lead 25 made of aluminum (Al) or the like is connected to the cathode 21, and an anode lead 26 made of nickel or the like is connected to the anode 22. The cathode lead 25 is welded to the safety valve mechanism 15 so as to be electrically connected to the battery cover 14, and the anode lead 26 is welded to the battery can 11 so as to be electrically connected to the battery can 11.

Figure 2:
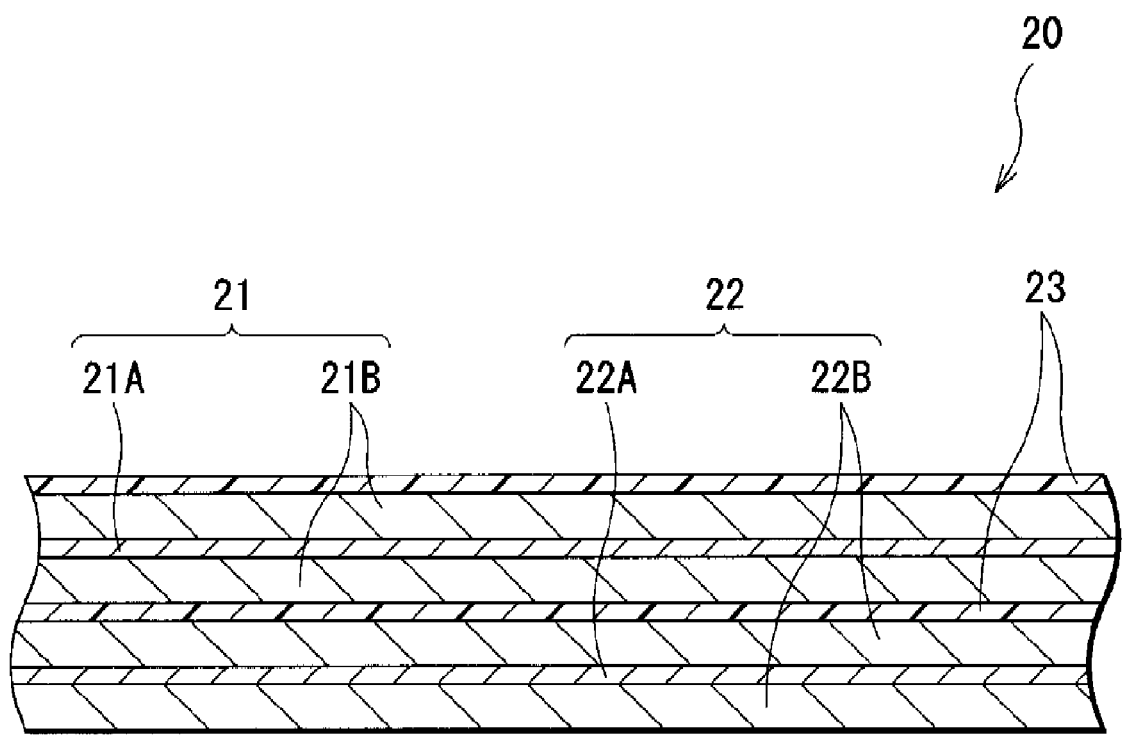
FIG. 2 is a partially enlarged sectional view of a spirally wound electrode body shown in FIG. 1.

FIG. 2 shows an enlarged view of a part of the spirally wound electrode body 20 shown in FIG. 1. The cathode 21 is formed by arranging a cathode active material layer 21B on both sides of a cathode current collector 21A having a pair of facing surfaces. The cathode active material layer 21B may be arranged on one side of the cathode current collector 21A. The cathode current collector 21A is made of, for example, a metal material such as aluminum, nickel or stainless. For example, as a cathode active material, the cathode active material layer 21B includes one kind or two or more kinds of cathode materials capable of inserting and extracting lithium as an electrode reactant. The cathode active material layer 21B may include an electrical conductor, a binder or the like, if necessary.

As the cathode material capable of inserting and extracting lithium, for example, a lithium-containing compound is preferable, because a high energy density is obtained. As the lithium-containing compound, lithium cobalt oxide, lithium nickel oxide, a solid solution including lithium cobalt oxide and lithium nickel oxide ($Li(Ni_xCo_yMn_z)O_2$; the values of x, y and z are $0<x<1$, $0<y<1$ and $0<z<1$, and $x+y+z=1$), lithium complex oxide such as lithium manganese oxide ($LiMn_2O_4$) with a spinel structure or a solid solution thereof ($Li(Mn_{2-v}Ni_v)O_4$; the value of v is $v<2$), or a phosphate compound with an olivine structure such as lithium iron phosphate ($LiFePO_4$) is preferable, because a high energy density may be obtained. Moreover, examples of the above-described cathode material include oxides such as titanium oxide, vanadium oxide and manganese dioxide, bisulfides such as iron bisulfide, titanium bisulfide and molybdenum sulfide, sulfur, and conductive polymers such as polyaniline and polythiophene.

The anode 22 is formed by arranging an anode active material layer 22B on both sides of an anode current collector 22A having a pair of facing surfaces. The anode active material layer 22B may be arranged on one side of the anode current collector 22A. The anode current collector 22A is preferably made of a metal material having good electrochemical stability, electrical conductivity and mechanical strength. Examples of the metal material include copper (Cu), nickel, stainless and the like. Among them, as the metal material, copper is preferable, because high electrical conductivity may be obtained.

In particular, as the metal material of which the anode current collector 22A is made, a metal material including one kind or two or more kinds of metal elements which do not form an intermetallic compound with lithium is preferable. When the metal elements form an intermetallic compound with lithium, the influence of a stress due to swelling and shrinkage of the anode active material layer 22B during charge and discharge causes a fracture of the anode active material layer 22B, so there is a possibility that the current collecting property declines, or the anode active martial layer 22B is peeled. Examples of the metal elements include copper, nickel, titanium (Ti), iron, chromium (Cr) and the like.

The anode active material layer 22B includes one kind or two or more kinds of anode material capable of inserting and extracting lithium as anode active materials. The anode active material layer 22B may include an electrical conductor, a binder or the like, if necessary. The charge capacity of the anode material capable of inserting and extracting lithium is preferably larger than the charge capacity of the cathode active material.

As the anode material capable of inserting and extracting lithium, for example, a carbon material is cited. Examples of such a carbon material include graphitizable carbon, non-graphitizable carbon with a (002) plane interval of 0.37 nm or more, graphite with a (002) plane interval of 0.34 nm or more, and the like. More specifically, kinds of pyrolytic carbon, kinds of coke, kinds of graphite, glass-like carbon fibers, fired organic polymer compound bodies, carbon fibers, activated carbon, kinds of carbon black and the like are cited. Among them, kinds of coke include pitch coke, needle coke, petroleum coke and so on, and the fired organic polymer compound bodies are polymers such as a phenolic resin and a furan resin which are carbonized by firing at an adequate temperature. These carbon materials are preferable, because a change in a crystal structure according to insertion and extraction of lithium is very small, so a high energy density may be obtained, and superior cycle characteristics may be obtained, and the carbon materials also function as electrical conductors.

As the anode material capable of inserting and extracting lithium, a material capable of inserting and extracting lithium and including at least one kind selected from the group consisting of metal elements and metalloid elements as an element is cited. Such an anode material is preferable, because a high energy density may be obtained. The anode material may be the simple substance, an alloy or a compound of a metal element or a metalloid element, or a material including a phase including one kind or two or more kinds of them at least in part. In the present invention, the alloy means an alloy including two or more kinds of metal elements as well as an alloy including one or more kinds of metal elements and one or more kinds of metalloid elements. Moreover, the alloy may include a non-metal element. As the texture of the alloy, a solid solution, a eutectic (eutectic mixture), an intermetallic compound or the coexistence of two or more kinds selected from them is cited.

Examples of the metal element or the metalloid element included in the anode material include metal elements and metalloid elements which are capable of forming an alloy with lithium. More specifically, magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt) or the like is cited. They may be crystalline or amorphous. As an alloy or a compound of any one of the metal elements and the metalloid elements, for example, an alloy or a compound represented by a chemical formula of $Ma_sMb_tLi_u$ (the values of s, t and u are s>0, t>0 and u>0, respectively) or $Ma_pMc_qMd_r$ (the values of p, q and r are p>0, q>0 and r>0, respectively) or the like is cited. In the chemical formulas, Ma represents at least one kind selected from metal elements and metalloid elements capable of forming an alloy with lithium, and Mb represents at least one kind selected from metal elements and metalloid elements except for lithium and Ma. Moreover, Mc represents at least one kind of non-metal element, and Md represents at least one kind selected from metal elements and metalloid elements except for Ma.

As the anode material made of a metal element or a metalloid element capable of forming an alloy with lithium, an anode material including at least one kind selected from the group consisting of Group 4B metal elements and Group 4B metalloid elements in the short form of the periodic table of the elements as an element is preferable, and a material including at least one kind selected from silicon and tin is specifically preferable. It is because the material has a large capability to insert and extract lithium, so a high energy density may be obtained.

As the material including at least one kind selected from the group consisting of silicon and tin, for example, at least one kind selected from the group consisting of the simple substance, alloys and compounds of silicon and the simple substance, alloys and compounds of tin is cited. More specifically, a material including the simple substance, an alloy or a compound of silicon, the simple substance, an alloy or a compound of tin, or a material including a phase of one kind or two or more kinds selected from them at least in a part thereof is cited. Only one kind or a mixture of a plurality of kinds selected from them may be used.

As an alloy of silicon, for example, an alloy including at least one kind selected from the group consisting of boron, magnesium, molybdenum, calcium, niobium, tantalum, vanadium, tungsten, tin, nickel, copper, iron, cobalt (Co), manganese (Mn), zinc, indium, silver, titanium, germanium, bismuth, antimony (Sb) and chromium as a second element in addition to silicon is cited. As an alloy of tin, for example, an alloy including at least one kind selected from the group consisting of boron, magnesium, molybdenum, calcium, niobium, tantalum, vanadium, tungsten, silicon, nickel, copper, iron, cobalt, manganese, zinc, indium, silver, titanium, germanium, bismuth, antimony and chromium as a second element in addition to tin is cited.

As a compound of silicon or a compound of tin, for example, a compound including oxygen, carbon or nitrogen is cited, and in addition to silicon or tin, the compound may include the above-described second element.

As the alloy or the compound of silicon or the ally or the compound of tin, for example, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0 \leq v \leq 2$), $LiSiO$, $Mg_2Sn$, $SnSiO_3$, $LiSnO$, $SnO_w$ ($0 \leq w \leq 2$) or the like is cited.

In particular, as the material including at least one kind selected from the group consisting of silicon and tin as an element, a material including a second element and a third element in addition to tin as a first element is preferable. The second element includes at least one kind selected from the group consisting of cobalt, iron, magnesium, titanium, vanadium (V), chromium, manganese, nickel, copper, zinc, gallium, zirconium, niobium (Nb), molybdenum (Mo), silver, indium, cerium (Ce), hafnium, tantalum (Ta), tungsten (W), bismuth and silicon. The third element includes at least one kind selected from the group consisting of boron, carbon, aluminum and phosphorus. It is because when the second element and the third element are included, cycle characteristics are improved.

Among them, a CoSnC-containing material in which tin, cobalt and carbon are included as elements, and the carbon content is within a range from 9.9 wt % to 29.7 wt % both inclusive, and the ratio of cobalt to the total of tin and cobalt (Co/(Sn+Co)) is within a range from 30 wt % to 70 wt % both inclusive is preferable, because a high energy density may be obtained in such a composition range.

The CoSnC-containing material may include any other element, if necessary. As the element, for example, silicon, iron, nickel, chromium, indium, niobium, germanium, titanium, molybdenum, aluminum, phosphorus, gallium, bismuth or the like is preferable, and two or more kinds selected from them may be included. It is because a higher effect may be obtained.

The CoSnC-containing material includes a phase including tin, cobalt and carbon, and the phase preferably has a low crystalline structure or an amorphous structure. Moreover, in the CoSnC-containing material, at least a part of carbon as an element is preferably bonded to a metal element or a metalloid element as another element. It is because cohesion or crystallization of tin or the like is prevented.

As a measuring method for checking the bonding state of an element, for example, X-ray photoelectron spectroscopy (XPS) is used. In the XPS, the peak of the 1s orbit (C1s) of carbon in the case of graphite is observed at 284.5 eV in an apparatus in which energy calibration is performed so that the peak of the 4f orbit (Au4f) of a gold atom is observed at 84.0 eV. Moreover, the peak of C1s of the surface contamination carbon is observed at 284.8 eV. On the other hand, in the case where the charge density of the carbon element increases, for example, in the case where carbon is bonded to a metal element or a metalloid element, the peak of C1s is observed in a region lower than 284.5 eV. In other words, in the case where the peak of the composite wave of C1s obtained in the CoSnC-containing material is observed in a region lower than 284.5 eV, at least a part of carbon included in the CoSnC-containing material is bonded to the metal element or the metalloid element which is another element.

Moreover, in the XPS measurement, for example, the peak of C1s is used to correct the energy axis of a spectrum. In general, surface contamination carbon exists on a material surface, so the peak of C1s of the surface contamination carbon is fixed at 284.8 eV, and the peak is used as an energy reference. In the XPS measurement, the waveform of the peak of C1s is obtained as a form including the peak of the surface contamination carbon and the peak of carbon in the CoSnC-containing material, so the peak of the surface contamination carbon and the peak of the carbon in the CoSnC-containing material are separated by analyzing the waveform through the use of, for example, commercially available software. In the analysis of the waveform, the position of a main peak existing on a lowest binding energy side is used as an energy reference (284.8 eV).

Further, as the anode material capable of inserting and extracting lithium, for example, a metal oxide or a polymer compound capable of inserting and extracting lithium or the like is cited. As the metal oxide, for example, iron oxide, ruthenium oxide, molybdenum oxide or the like is cited, and as the polymer compound, for example, polyacetylene, polyaniline, polypyrrole or the like is cited.

A combination of the above-described series of anode materials capable of inserting and extracting lithium may be used.

As the electrical conductor, for example, a carbon material such as graphite, carbon black or ketjen black is cited. Only one kind or a mixture of a plurality of kinds selected from them may be used. As long as the electrical conductor is a material having electrical conductivity, any metal material or any conductive polymer may be used.

As the binder, for example, synthetic rubber such as styrene butadiene-based rubber, fluorine-based rubber or ethylene propylene diene or a polymer material such as polyvinylidene fluoride is cited. Only one kind or a mixture of a plurality of kinds selected from them may be used. However, as shown in FIG. 1, in the case where the cathode 21 and the anode 22 are spirally wound, styrene butadiene-based rubber or fluorine-based rubber which has high flexibility is preferably used.

The separator 23 isolates between the cathode 21 and the anode 22 so that lithium ions pass therethrough while preventing a short circuit of a current due to contact between the cathode 21 and the anode 22. The separator 23 is made of, for example, a porous film of a synthetic resin such as polytetrafluoroethylene, polypropylene or polyethylene, or a porous ceramic film, and the separator 23 may have a configuration in which two or more kinds of the porous films are laminated. Among them, a porous film made of polyolefin is preferable, because a short-circuit preventing effect is superior, and the safety of the battery by a shutdown effect may be improved. In particular, polyethylene is preferable, because a shutdown effect may be obtained within a range from 100° C. to 160° C. both inclusive, and electrochemical stability is superior. Moreover, polypropylene is preferable, and any other resin having chemical stability may be used by copolymerizing or blending with polyethylene or polypropylene.

The separator 23 is impregnated with the above-described electrolytic solution as a liquid electrolyte, because cycle characteristics may be improved.

The secondary battery is manufactured by the following steps, for example.

At first, the cathode active material layer 21B is formed on both sides of the cathode current collector 21A to form the cathode 21. The cathode active material layer 21B is formed by the following steps. A cathode mixture formed by mixing cathode active material powder, the electrical conductor and the binder is dispersed in a solvent to form paste-form cathode mixture slurry, and the cathode mixture slurry is applied to the cathode current collector 21A, and the cathode mixture slurry is dried and compression molded, thereby the cathode active material layer 21B is formed. Moreover, for example, by the same steps as those in the case of the cathode 21, the anode 22 is formed by forming the anode active material layer 22B on the both sides of the anode current collector 22A.

Next, the cathode lead 25 is attached to the cathode current collector 21A by welding, and the anode lead 26 is attached to the anode current collector 22A by welding. Then, the cathode 21 and the anode 22 are spirally wound with the separator 23 in between so as to form the spirally wound electrode body 20, and an end of the cathode lead 25 is welded to the safety valve mechanism 15, and an end of the anode lead 26 is welded to the battery can 11. Next, the spirally wound electrode body 20 is sandwiched between the pair of insulating plates 12 and 13, and they are contained in the battery can 11. Next, the electrolytic solution is injected into the battery can 11 so as to impregnate the separator 23 with the electrolytic solution. Finally, the battery cover 14, the safety valve mechanism 15 and the PTC device 16 are fixed in an opened end portion of the battery can 11 by caulking by the gasket 17. Thereby, the secondary battery shown in FIGS. 1 and 2 is completed.

When the secondary battery is charged, lithium ions are extracted from the cathode 21, and are inserted into the anode 22 through the electrolytic solution. On the other hand, when the secondary battery is discharged, the lithium ions are extracted from the anode 22 and are inserted into the cathode 21 through the electrolytic solution.

In the case where the capacity of the anode is represented by a capacity component based on insertion and extraction of lithium, the above-described electrolytic solution is included, so the decomposition of the electrolytic solution is prevented, and even if charge and discharge are repeated, it is difficult to reduce the charge capacity. Therefore, cycle characteristics may be improved. Other effects relating to the secondary battery are the same as those in the above-described electrolytic solution.

Next, second and third batteries will be described below, and like components are denoted by like numerals as of the first battery, and will not be further described.

(Second Battery)

The second battery has the same configuration, functions and effects as those of the first battery, except for the configuration of an anode 22 is different, and the second battery is manufactured by the same steps as those in the first battery.

The anode 22 has a configuration in which the anode active material layer 22B is arranged on both sides of the anode current collector 22A as in the case of the first battery. As the anode active material, the anode active material layer 22B includes, for example, a material including silicon or tin as an element. More specifically, for example, the anode active material includes the simple substance, an alloy or a compound of silicon, or the simple substance, an alloy or a compound of tin, and the anode active material may include two or more kinds selected from them.

The anode active material layer 22B is formed by, for example, a vapor-phase method, a liquid-phase method, a spraying method or a firing method, or a combination of two or more methods selected from them, and the anode active material layer 22B and the anode current collector 22A are preferably alloyed in at least a part of an interface therebetween. More specifically, in the interface, an element of the anode current collector 22A is preferably diffused into the anode active material layer 22B, or an element of the anode active material layer 22B is preferably diffused into the anode current collector 22A, or they are preferably diffused into each other, because a fracture of the anode active material layer 22B due to swelling and shrinkage thereof according to charge and discharge may be inhibited, and the electronic conductivity between the anode active material layer 22B and the anode current collector 22A may be improved.

As the vapor-phase method, for example, a physical deposition method or a chemical deposition method, more specifically, a vacuum deposition method, a sputtering method, an ion plating method, a laser ablation method, a thermal CVD (chemical vapor deposition) method, a plasma chemical vapor deposition method or the like is cited. As the liquid-phase method, a known technique such as electrolytic plating or electroless plating may be used. In the firing method, for example, a particulate anode active material is mixed with a binder or the like to form a mixture, and the mixture is applied by dispersing the mixture in a solvent, and then the mixture is heated at a higher temperature than the melting point of the binder or the like. As the firing method, a known technique such as, for example, an atmosphere firing method, a reaction firing method or a hot press firing method is cited.

(Third Battery)

The third battery is a so-called lithium metal secondary battery, in which the capacity of the anode 22 is represented by a capacity component based on precipitation and dissolution of lithium. The secondary battery has the same configuration as that of the first battery, except that the anode active material layer 22B is made of lithium metal, and the secondary battery is manufactured by the same steps as those in the first battery.

The secondary battery uses lithium metal as the anode active material, so a higher energy density may be obtained. The anode active material layer 22B may exist at the time of assembling, or may not exist at the time of assembling, and may be formed of lithium metal precipitated at the time of charge. Moreover, the anode active material layer 22B may be used also as a current collector, thereby the anode current collector 22A may be removed.

When the secondary battery is charged, lithium ions are extracted from the cathode 21, and the lithium ions are precipitated on the surface of the anode current collector 22A as lithium metal through the electrolytic solution. When the secondary battery is discharged, the lithium metal is dissolved from the anode active material layer 22B as lithium ions, and the lithium ions are inserted into the cathode 21 through the electrolytic solution.

In the case where the capacity of the anode is represented by a capacity component based on precipitation and dissolution of lithium, the above-described electrolytic solution is included, so the cycle characteristics may be improved. Other effects relating to the secondary battery are the same as those in the first battery.

(Fourth Battery)

Figure 3:
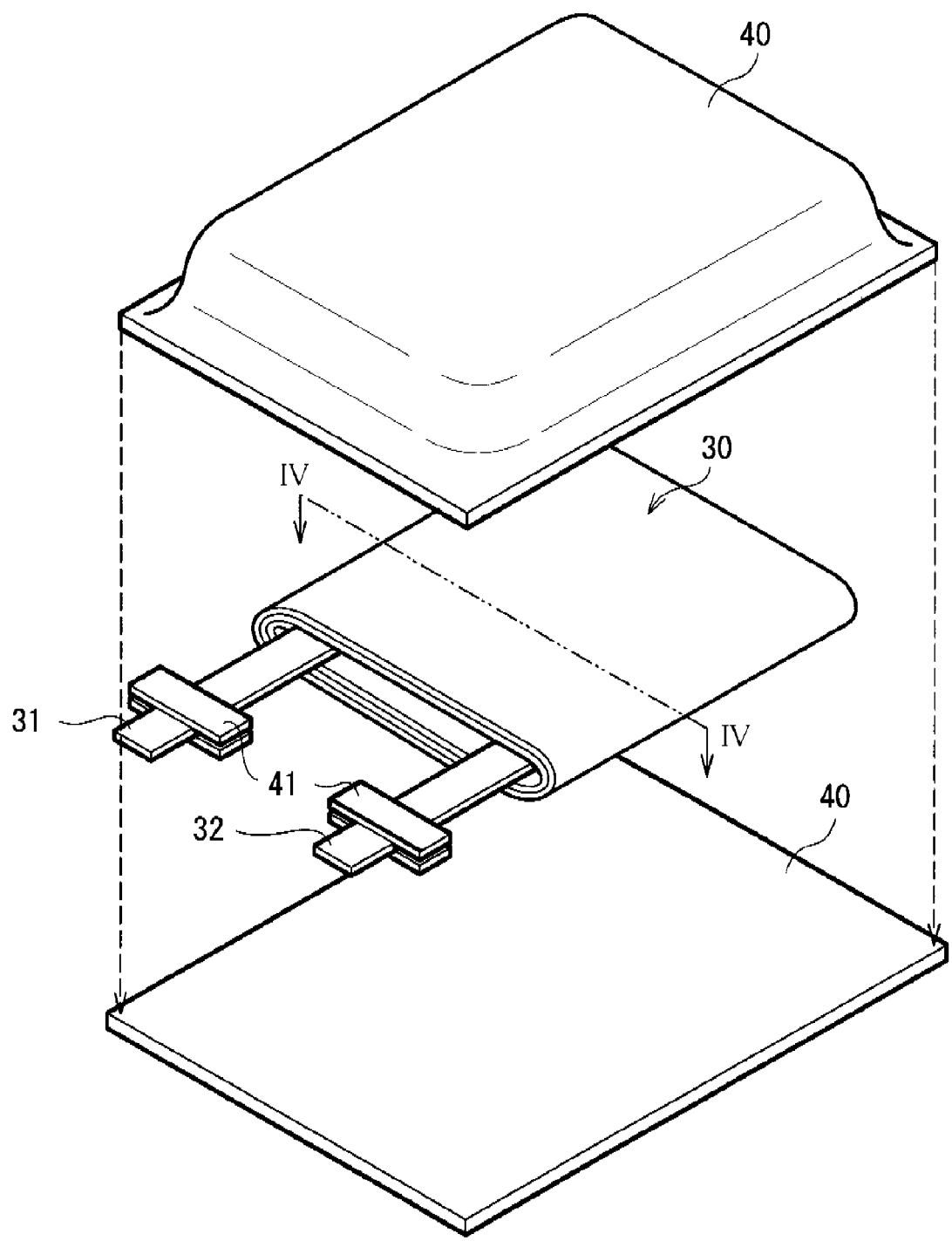
FIG. 3 is an exploded perspective view of a fourth battery using the electrolytic solution according to the embodiment of the invention.

FIG. 3 shows an exploded perspective view of a fourth battery. In the battery, a spirally wound electrode body 30 to which a cathode lead 31 and an anode lead 32 are attached is contained in film-shaped package members 40, and the configuration of the battery is a so-called laminate film type.

The cathode lead 31 and the anode lead 32 are drawn, for example, from the interiors of the package members 40 to outside in the same direction. The cathode lead 31 is made of, for example, a metal material such as aluminum, and the anode lead 32 are made of, for example, a metal material such as copper, nickel or stainless. The metal materials of which the cathode lead 31 and the anode lead 32 are made each have a sheet shape or a mesh shape.

The package members 40 are made of, for example, a rectangular aluminum laminate film including a nylon film, aluminum foil and a polyethylene film which are bonded in this order. The package members 40 are arranged so that the polyethylene film of each of the package members 40 faces the spirally wound electrode body 30, and edge portions of the package members 40 are adhered to each other by fusion bonding or an adhesive. An adhesive film 41 is inserted between the package members 40 and the cathode lead 31 and the anode lead 32 for preventing the entry of outside air. The adhesive film 41 is made of, for example, a material having adhesion to the cathode lead 31 and the anode lead 32, for example, a polyolefin resin such as polyethylene, polypropylene, modified polyethylene or modified polypropylene.

In addition, the package members 40 may be made of a laminate film with any other configuration, a polymer film such as polypropylene or a metal film instead of the above-described three-layer aluminum laminate film.

Figure 4:
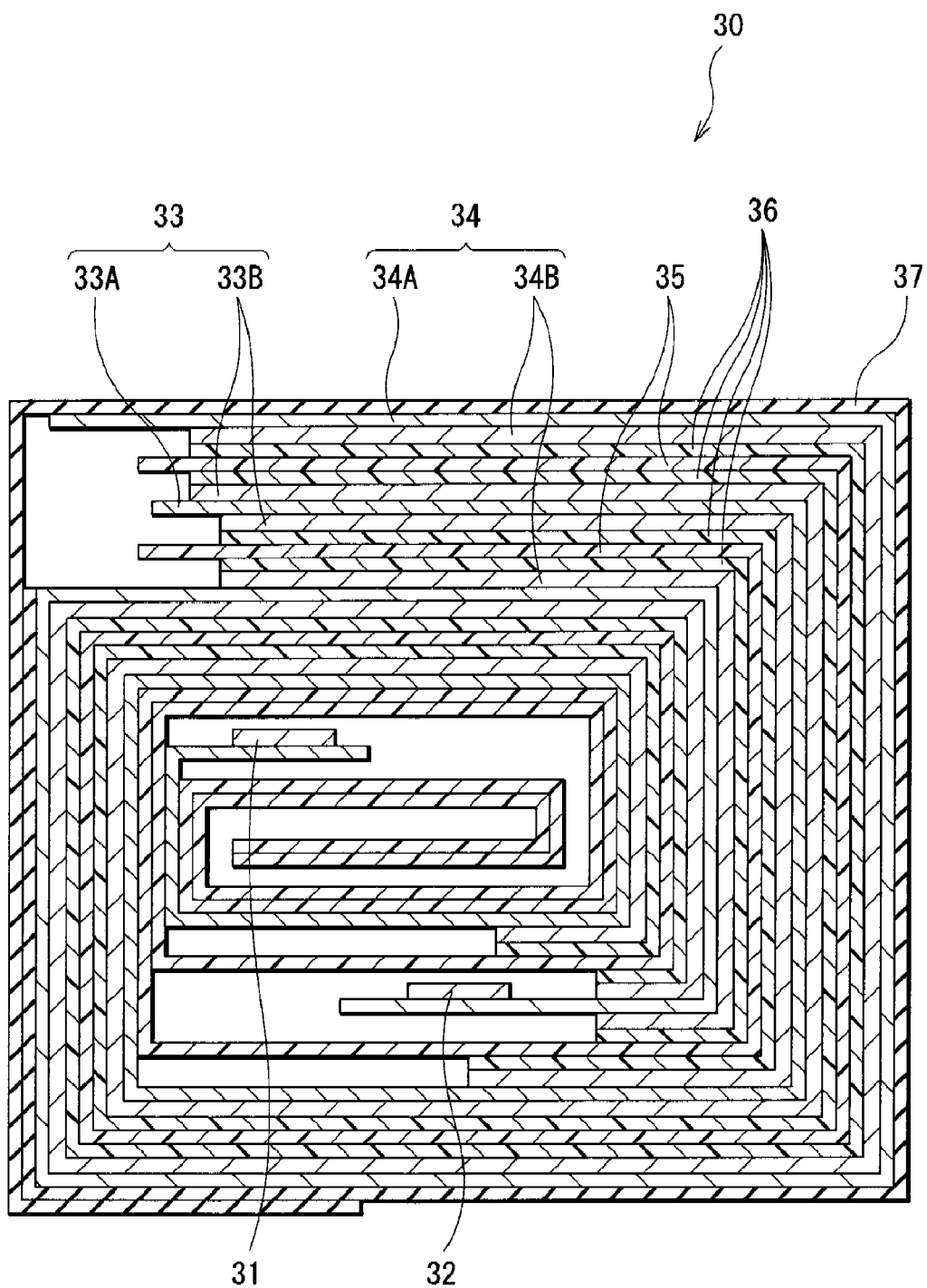
FIG. 4 is a sectional view showing a spirally wound electrode body taken along a line IV-IV of FIG. 3.

FIG. 4 shows a sectional view of the spirally wound electrode body 30 taken along a line IV-IV of FIG. 3. The spirally wound electrode body 30 is formed by laminating a cathode 33 and an anode 34 with a separator 35 and an electrolyte 36 in between, and then spirally winding them, and an outermost portion of the spirally wound electrode body 30 is protected with a protective tape 37.

The cathode 33 is formed by arranging a cathode active material layer 33B on both sides of a cathode current collector 33A. The anode 34 is formed by arranging an anode active material layer 34B on both sides of an anode current collector 34A, and the anode 34 is arranged so that the anode active material layer 34B faces the cathode active material layer 33B. The configurations of the cathode current collector 33A, the cathode active material layer 33B, the anode current collector 34A, the anode active material layer 34B and the separator 35 are the same as those of the cathode current collector 21A, the cathode active material layer 21B, the anode current collector 22A, the anode active material layer 22B and the separator 23 in the above-described first, second and third batteries, respectively.

The electrolyte 36 includes the above-described electrolytic solution and a polymer compound holding the electrolytic solution, and is a so-called gel electrolyte. The gel electrolyte is preferable, because the gel electrolyte is able to obtain high ionic conductivity (for example, 1 mS/cm or over at room temperature), and leakage of an electrolyte from the battery is prevented.

Examples of the polymer compound include polyacrylonitrile, polyvinylidene fluoride, a copolymer of polyvinylidene fluoride and polyhexafluoropyrene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acids, polymethacrylic acids, styrene-butadiene rubber, nitrile-butadiene rubber, polystyrene, polycarbonate and the like. One kind or a mixture of a plurality of kinds selected from them may be used. In particular, in terms of electrochemical stability, polyacrylonitrile, polyvinylidene fluoride, polyhexafluoropropylene, polyethylene oxide or the like is preferably used. The content of the polymer compound in the electrolytic solution depends on compatibility between them, but is preferably within a range from 5 wt % to 50 wt % both inclusive.

The content of the electrolyte salt is the same as that in the case of the above-described first, second and third batteries. The solvent in this case has a wide concept including not only a liquid solvent but also a solvent having ionic conductivity capable of dissociating the electrolyte salt. Therefore, in the case where a polymer compound having ionic conductivity is used, the polymer compound is included in the concept of the solvent.

In addition, as the electrolyte 36, instead of an electrolyte in which the polymer compound holds the electrolytic solution, the electrolytic solution may be used as it is. In this case, the separator 35 is impregnated with the electrolytic solution.

The secondary battery may be manufactured by the following three kinds of manufacturing methods, for example.

In a first manufacturing method, by the same steps as those in the method of manufacturing the first battery, at first, the cathode active material layer 33B is formed on both sides of the cathode current collector 33A so as to form the cathode 33. Moreover, for example, by the same steps as those in the method of manufacturing the first battery, the anode active material layer 34B is formed on both sides of the anode current collector 34A so as to form the anode 34.

Next, the gel electrolyte 36 is formed by preparing a precursor solution including the electrolytic solution, the polymer compound and a solvent, applying the precursor solution to the cathode 33 and the anode 34, and volatilizing the solvent. Next, the cathode lead 31 and the anode lead 32 are attached to the cathode current collector 33A and the anode current collector 34A, respectively. Next, after the cathode 33 on which the electrolyte 36 is formed and the anode 34 on which the electrolyte 36 is formed are laminated with the separator 35 in between to form a laminate, the laminate is spirally wound in a longitudinal direction, and the protective tape 37 is bonded to an outermost portion of the laminate so as to form the spirally wound electrode body 30. Then, for example, the spirally wound electrode body 30 is sandwiched between two film-shaped package members 40, and edge portions of the package members 40 are adhered to each other by thermal fusion bonding or the like to seal the spirally wound electrode body 30 in the package members 40. At this time, the adhesive film 41 is inserted between the cathode lead 31 and the anode lead 32, and the package members 40. Thereby, the secondary battery shown in FIGS. 3 and 4 is completed.

In a second manufacturing method, at first, after the cathode lead 31 and the anode lead 32 are attached to the cathode 33 and the anode 34, respectively, the cathode 33 and the anode 34 are laminated with the separator 35 in between to form a laminate, and the laminate is spirally wound, and the protective tape 37 is bonded to an outermost portion of the spirally wound laminate so as to form a spirally wound body as a precursor body of the spirally wound electrode body 30. Next, the spirally wound body is sandwiched between two film-shaped package members 40, and the edge portions of the package members 40 except for edge portions on one side are adhered by thermal fusion bonding or the like to form a pouched package, thereby the spirally wound body is contained in the package members 40. An electrolytic composition which includes the electrolytic solution, monomers as materials of a polymer compound and a polymerization initiator and, if necessary, any other material such as a polymerization inhibitor is prepared, and the composition is injected in the package members 40, and then an opened portion of the package members 40 are sealed by thermal fusion bonding or the like. Finally, the monomers are polymerized by applying heat to form the polymer compound, thereby the gel electrolyte 36 is formed. Thus, the secondary battery is completed.

In a third manufacturing method, as in the case of the first manufacturing method, the spirally wound body is formed, and the spirally wound body is contained in the package members 40, except that the separator 35 with both sides coated with a polymer compound is used. As the polymer compound applied to the separator 35, for example, a polymer including vinylidene fluoride as a component, that is, a homopolymer, a copolymer, a multicomponent copolymer, or the like is cited. More specifically, polyvinylidene fluoride, a binary copolymer including vinylidene fluoride and hexafluoropropylene as components, a ternary copolymer including vinylidene fluoride, hexafluoropropylene and chlorotrifluoroethylene as components is cited. The polymer compound may include one kind or two or more kinds of other polymer compounds in addition to the above-described polymer including vinylidene fluoride as a component. Next, after the electrolytic solution is prepared, and injected into the package members 40, an opened portion of the package members 40 is sealed by thermal fusion bonding or the like. Finally, the package members 40 are heated while being weighted so that the separator 35 is brought into close contact with the cathode 33 and the anode 34 with the polymer compound in between. Thereby, the polymer compound is impregnated with the electrolytic solution, and the polymer compound is gelatinized so as to form the electrolyte 36, so the secondary battery is completed. In the third manufacturing method, compared to the first manufacturing method, swelling characteristics are improved. Moreover, in the third manufacturing method, compared to the second manufacturing method, monomers as the materials of the polymer compound, the solvent and the like hardly remain in the electrolyte 36, and a step of forming the polymer compound is controlled well, so sufficient adhesion between the cathode 33 and anode 34, and the separator 35 and the electrolyte 36 is obtained.

The functions and effects of the laminate type secondary battery are the same as those in the first, second and third batteries.

EXAMPLES

Specific examples of the invention will be described in detail below.

Example 1-1

A cylindrical secondary battery shown in FIGS. 1 and 2 was formed through the use of artificial graphite as an anode active material. At that time, the secondary battery was a lithium-ion secondary battery in which the capacity of the anode 22 was represented by a capacity component based on insertion and extraction of lithium. Details will be described below.

At first, the cathode 21 was formed. After lithium carbonate ($Li_2CO_3$) and cobalt carbonate ($CoCO_3$) were mixed at a molar ratio of 0.5:1, the mixture was fired in air at 900° C. for 5 hours to obtain a lithium-cobalt complex oxide ($LiCoO_2$). Next, after 91 parts by weight of the lithium-cobalt complex oxide as a cathode active material, 6 parts by weight of graphite as an electrical conductor and 3 parts by weight of polyvinylidene fluoride as a binder were mixed to form a cathode mixture, the cathode mixture was dispersed in N-methyl-2-pyrrolidone to form paste-form cathode mixture slurry. Then, after the cathode mixture slurry was uniformly applied to the cathode current collector 21A made of strip-shaped aluminum foil (with a thickness of 20 μm), and was dried, the cathode mixture slurry was compression molded by a roller press to form the cathode active material layer 21B. After that, the cathode lead 25 was attached to an end of the cathode current collector 21A.

Next, the anode 22 was formed. At first, 90 parts by weight of graphite powder as an anode active material and 10 parts by weight of polyvinylidene fluoride as a binder were mixed to form an anode mixture, and then the anode mixture was dispersed in N-methyl-2-pyrrolidone to form paste-form anode mixture slurry. Then, after the anode mixture slurry was uniformly applied to the anode current collector 22A made of strip-shaped copper foil (with a thickness of 15 μm), and was dried, the anode mixture slurry was compression molded by a roller press to form the anode active material layer 22B. After that, the anode lead 26 was attached to an end of the anode current collector 22A.

Next, the electrolytic solution was prepared. At first, as a solvent, ethylene carbonate (EC), dimethyl carbonate (DMC) and a compound having a difluoroalkene structure were mixed. At that time, the mixture ratio of EC and DMC was 30:70 as a weight ratio, and as the compound having a difluoroalkene structure, the compound represented by Chemical Formula 2(1) was used, and the content of the compound represented by Chemical Formula 2(1) in the solvent was 0.01 wt %. The unit "wt %" means a value in the case where the whole solvent is 100 wt %, and hereinafter the meaning of "wt %" is the same. After that, lithium hexafluorophosphate ($LiPF_6$) as an electrolyte salt was added to and dissolved in the solvent so that the concentration of the electrolyte salt in the electrolytic solution became 1 mol/kg.

Next, the separator 23 made of a microporous polypropylene film (with a thickness of 25 μm) was prepared, and the anode 22, the separator 23, the cathode 21 and the separator 23 were laminated in this order to form a laminate, and then the laminate was spirally wound several times to form the spirally wound electrode body 20. Then, the spirally wound electrode body 20 was sandwiched between a pair of insulating plates 12 and 13, and the anode lead 26 was welded to the battery can 11, and the cathode lead 25 was welded to the safety valve mechanism 15, and then the spirally wound electrode body 20 was contained in the battery can 11 made of nickel-plated iron. Finally, the electrolytic solution was injected into the battery can 11 by a decompression method so as to form the cylindrical secondary battery.

Examples 1-2 to 1-4

Secondary batteries were formed by the same steps as those in Example 1-1, except that the content of the compound represented by Chemical Formula 2(1) in the solvent was 1 wt % (Example 1-2), 2 wt % (Example 1-3) or 5 wt % (Example 1-4).

Examples 1-5 to 1-7

Secondary batteries were formed by the same steps as those in Example 1-2, except that instead of the compound represented by Chemical Formula 2(1), the compound represented by Chemical Formula 2(2) (Example 1-6), the compound represented by Chemical Formula 2(3) (Example 1-6) or the compound represented by Chemical Formula 2(4) (Example 1-7) was used.

Examples 1-8 to 1-12

Secondary batteries were formed by the same steps as those in Example 1-3, except that as the solvent, vinylene carbonate (VC: Example 1-8) as the cyclic carbonate including an unsaturated bond, bis(fluoromethyl)carbonate (DFDMC: Example 1-9) as the chain carbonate represented by Chemical Formula 6 which included a halogen, 4-fluoro-1,3-dioxolane-2-one (FEC: Example 1-10), trans-4,5-difluoro-1,3-dioxolane-2-one (t-DFEC: Example 1-11) or cis-4,5-difluoro-1,3-dioxolane-2-one (c-DFEC: Example 1-12) as the cyclic carbonate represented by Chemical Formula 7 which included a halogen was added. At that time, the content of VC or the like in the solvent was 1 wt %.

Example 1-13

A secondary battery was formed by the same steps as those in Example 1-3, except that as the electrolyte salt, the compound represented by Chemical Formula 13(2) as the compound represented by Chemical Formula 11 was added. At that time, the concentration of $LiPF_6$ in the electrolytic solution was 0.9 mol/kg, and the concentration of the compound represented by Chemical Formula 13(2) was 0.1 mol/kg.

Comparative Example 1-1 to 1-4

Secondary batteries were formed by the same steps as those in Examples 1-1, 1-10, 1-11 and 1-13, except that the compound represented by Chemical Formula 2(1) was not added.

When the cycle characteristics of the secondary batteries of Examples 1-1 to 1-13 and Comparative Examples 1-1 to 1-4 were determined, results shown in Table 1 were obtained.

To determine the cycle characteristics, after the secondary batteries were repeatedly charged and discharged by the following steps so as to determine the discharge capacity retention ratios of the secondary batteries. At first, 2 cycles of charge and discharge were performed in an atmosphere at 23° C., and then the discharge capacity (discharge capacity in the second cycle) of each of the secondary batteries was determined. Next, 102 cycles of charge and discharge in total were performed in a constant temperature bath at 45° C., and then the discharge capacity (discharge capacity in the 102nd cycle) of each of the secondary batteries was determined. Finally, the discharge capacity retention ratio (%)=(discharge capacity in the 102nd cycle/discharge capacity in the second cycle)×100 was determined by calculation. As the conditions of 1 cycle of charge, after the secondary batteries were charged at a constant current of 1 C until the battery voltage reached 4.2 V, the secondary batteries were charged at a constant voltage of 4.2 V until the total charge time reached 2 hours. Moreover, as the conditions of 1 cycle of discharge, the secondary batteries were discharged at a constant current of 0.5 C until the battery voltage reached 3.0 V. The unit "C" represents a value showing a current condition, and "1 C" represents a current value at which the theoretical capacity of the battery is fully discharged for 1 hour, and "0.5 C" represents a current value at which the theoretical capacity of the battery is fully discharged for 2 hours.

In addition, the same steps and the same conditions as the above-described steps and the above-described conditions were used to determine the cycle characteristics of secondary batteries in the following examples and the following comparative examples.

active material, when the solvent of the electrolytic solution included the compound having a difluoroalkene structure such as the compound represented by Chemical Formula 1, the cycle characteristics were improved. In particular, it was confirmed that when the content of the compound having a difluoroalkene structure in the solvent was within a range from 0.01 wt % to 5 wt % both inclusive, a sufficient effect was obtained, and when the content was within a range from 1 wt % to 5 wt % both inclusive, a higher effect was obtained.

Moreover, in Examples 1-8 to 1-12 in which the solvent included VC or the like, the discharge capacity retention ratio was higher than that in Example 1-3 in which the solvent did

TABLE 1

Anode active material: artificial graphite

| | | SOLVENT | | | DISCHARGE CAPACITY RETENTION RATIO |
|---|---|---|---|---|---|
| | ELECTROLYTE SALT | KIND | COMPOUND HAVING DIFLUOROALKENE STRUCTURE KIND | WT % | (%) |
| EXAMPLE 1-1 | LiPF$_6$ | EC + DMC | CHEMICAL FORMULA 2(1) | 0.01 | 76 |
| EXAMPLE 1-2 | 1 mol/kg | | | 1 | 80 |
| EXAMPLE 1-3 | | | | 2 | 81 |
| EXAMPLE 1-4 | | | | 5 | 80 |
| EXAMPLE 1-5 | | | CHEMICAL FORMULA 2(2) | 1 | 78 |
| EXAMPLE 1-6 | | | CHEMICAL FORMULA 2(3) | 1 | 78 |
| EXAMPLE 1-7 | | | CHEMICAL FORMULA 2(4) | 1 | 80 |
| EXAMPLE 1-8 | | EC + DMC VC | CHEMICAL FORMULA 2(1) | 2 | 83 |
| EXAMPLE 1-9 | | DFDMC | | | 82 |
| EXAMPLE 1-10 | | FEC | | | 83 |
| EXAMPLE 1-11 | | t-DFEC | | | 84 |
| EXAMPLE 1-12 | | c-DFEC | | | 84 |
| EXAMPLE 1-13 | LiPF$_6$ 0.9 mol/kg CHEMICAL FORMULA 13(2) 0.1 mol/kg | EC + DMC | CHEMICAL FORMULA 2(1) | 2 | 82 |
| COMPARATIVE EXAMPLE 1-1 | LiPF$_6$ 1 mol/kg | EC + DMC | — | | 75 |
| COMPARATIVE EXAMPLE 1-2 | | EC + DMC FEC | | | 80 |
| COMPARATIVE EXAMPLE 1-3 | | t-DFEC | | | 82 |
| COMPARATIVE EXAMPLE 1-4 | LiPF$_6$ 0.9 mol/kg CHEMICAL FORMULA 13(2) 0.1 mol/kg | EC + DMC | — | | 77 |

As shown in Table 1, in Examples 1-1 to 1-7 in which the solvent included the compound represented by Chemical Formula 2(1), 2(2), 2(3) or 2(4), the discharge capacity retention ratio was higher than that in Comparative Example 1-1 in which the solvent did not include the compound. In this case, regarding the kind of the compound having a difluoroalkene structure, the discharge capacity retention ratios in Examples 1-2 and 1-5 to 1-7 were substantially the same, and irrespective of the kind, a high discharge capacity retention ratio was obtained. In particular, regarding the content of the compound represented by Chemical Formula 2(1) in the solvent, there was a tendency that as the content increased, the discharge capacity retention ratio was increased, and then became substantially constant, and when the content was 1 wt % or more, the discharge capacity retention ratio became higher.

Therefore, it was confirmed that in the secondary battery according to the embodiment of the invention, in the case where the anode 22 included artificial graphite as the anode not include VC or the like. In this case, compared between FEC, t-DFEC and c-DFEC, there was a tendency that the discharge capacity retention ratio in the case where t-DFEC or c-DFEC was included was higher than that in the case where FEC was included. The discharge capacity retention ratios in Examples 1-10 and 1-11 in which the solvent included the compound represented by Chemical Formula 2(1) were higher than those in Comparative Examples 1-2 and 1-3 in which the solvent did not include the compound.

Therefore, it was confirmed that in the above-described secondary battery, when the solvent included the cyclic carbonate including an unsaturated bond, the chain carbonate represented by Chemical Formula 6 which included a halogen, or the cyclic carbonate represented by Chemical Formula 7 which included a halogen, the cycle characteristics were further improved. In particular, it was confirmed that in the case where the cyclic carbonate represented by Chemical Formula 7 which included a halogen was used, the more the number of halogens increased, the more the cycle characteristics were improved. The same result was obtained in the case where the chain carbonate represented by Chemical Formula 6 which included a halogen was used. The result in the case where fluoromethyl methyl carbonate is included in the solvent is not shown here; however, fluoromethyl methyl carbonate has the same properties as bis(fluoromethyl)carbonate, so it is obvious that even in the case where fluoromethyl methyl carbonate is used, the same effects as those in the case where bis(fluoromethyl)carbonate is used are obtained. The same hold for the case where a chain carbonate represented by Chemical Formula 6 which includes a halogen and a cyclic carbonate represented by Chemical Formula 7 which includes a halogen are mixed, or the case where two or more kinds of chain carbonates represented by Chemical Formula 6 or two or more kinds of cyclic carbonates represented by Chemical Formula 7 are mixed.

Moreover, in Example 1-13 in which the electrolyte salt included the compound represented by Chemical Formula 13(2), the discharge capacity retention ratio was higher than that in Example 1-3 in which the electrolyte salt did not include the compound. In Example 1-13 in which the solvent included the compound represented by Chemical Formula 2(1), the discharge capacity retention ratio was higher than that in Comparative Example 1-4 in which the solvent did not include the compound.

Therefore, it was confirmed that in the above-described secondary battery, when the electrolyte salt included the compound represented by Chemical Formula 11, a higher effect was obtained. The result in the case where the electrolyte salt includes the compound represented by Chemical Formula 10 or 12 is not shown here; however, the compounds represented by Chemical Formulas 10 and 12 have the same properties as the compound represented by Chemical Formula 11, so it is obvious that in the case where the compound represented by Chemical Formula 10 or 12 is included, the same effects are obtained. The same holds for the case where the compounds represented by Chemical Formulas 10 to 12 are mixed, or the case where two or more kinds of the compounds represented by Chemical Formula 10, 11 or 12 are mixed.

Examples 2-1 to 2-7, 2-13

Secondary batteries were formed by the same steps as those in Examples 1-1 to 1-7 and 1-13, except that as the anode active material, instead of artificial graphite, silicon was used to form the anode active material layer 22B, and as the solvent, instead of DMC, diethyl carbonate (DEC) was used. When the anode active material layer 22B was formed, silicon was deposited on the anode current collector 22A by an electron beam evaporation method.

Examples 2-8 to 2-12

Secondary batteries were formed by the same steps as those in Examples 1-8 to 1-12, except that as in the case of Examples 2-1 to 2-7, as the anode active material, silicon was used to form the anode active material layer 22B, and as the solvent, DMC was used, and the composition of the solvent was changed. At that time, the content of VC or the like in the solvent was 1 wt % in Examples 2-8 and 2-9, and 5 wt % in Examples 2-10 to 2-12.

Comparative Examples 2-1 to 2-4

Secondary batteries were formed by the same steps as those in Comparative Examples 1-1 to 1-4, except that as in the case of Examples 2-1 to 2-7, as the anode active material, silicon was used to form the anode active material layer 22B, and as the solvent, DMC was used, and the composition of the solvent was changed. At that time, in Comparative Examples 2-2 and 2-3, the content of FEC or the like in the solvent was 5 wt %.

When the cycle characteristics of the secondary batteries of Examples 2-1 to 2-13 and Comparative Examples 2-1 to 2-4 were determined, results shown in Table 2 were obtained.

TABLE 2

Anode active material: silicon

| | ELECTROLYTE SALT | SOLVENT KIND | COMPOUND HAVING DIFLUOROALKENE STRUCTURE KIND | WT % | DISCHARGE CAPACITY RETENTION RATIO (%) |
|---|---|---|---|---|---|
| EXAMPLE 2-1 | LiPF$_6$ | EC + DEC | CHEMICAL FORMULA 2(1) | 0.01 | 45 |
| EXAMPLE 2-2 | 1 mol/kg | | | 1 | 50 |
| EXAMPLE 2-3 | | | | 2 | 55 |
| EXAMPLE 2-4 | | | | 5 | 52 |
| EXAMPLE 2-5 | | | CHEMICAL FORMULA 2(2) | 1 | 52 |
| EXAMPLE 2-6 | | | CHEMICAL FORMULA 2(3) | 1 | 52 |
| EXAMPLE 2-7 | | | CHEMICAL FORMULA 2(4) | 1 | 53 |
| EXAMPLE 2-8 | | EC + DEC VC | CHEMICAL FORMULA 2(1) | 2 | 67 |
| EXAMPLE 2-9 | | DFDMC | | | 67 |
| EXAMPLE 2-10 | | FEC | | | 64 |
| EXAMPLE 2-11 | | t-DFEC | | | 79 |
| EXAMPLE 2-12 | | c-DFEC | | | 79 |
| EXAMPLE 2-13 | LiPF$_6$ 0.9 mol/kg CHEMICAL FORMULA 13(2) 0.1 mol/kg | EC + DEC | CHEMICAL FORMULA 2(1) | 2 | 57 |
| COMPARATIVE EXAMPLE 2-1 | LiPF$_6$ 1 mol/kg | EC + DEC | — | | 40 |

TABLE 2-continued

Anode active material: silicon

| | ELECTROLYTE SALT | | SOLVENT | | | DISCHARGE CAPACITY RETENTION RATIO (%) |
| --- | --- | --- | --- | --- | --- | --- |
| | | KIND | COMPOUND HAVING DIFLUOROALKENE STRUCTURE | | | |
| | | | KIND | WT % | | |
| COMPARATIVE EXAMPLE 2-2 | | EC + DEC | FEC | | | 60 |
| COMPARATIVE EXAMPLE 2-3 | | | t-DFEC | | | 76 |
| COMPARATIVE EXAMPLE 2-4 | LiPF$_6$ 0.9 mol/kg | CHEMICAL FORMULA 13(2) 0.1 mol/kg | EC + DEC | — | | 50 |

As shown in Table 2, in the case where silicon was used as the anode active material, the same results as those shown in Table 1 were obtained. More specifically, in Examples 2-1 to 2-13 in which the solvent included the compound represented by Chemical Formula 2(1), 2(2), 2(3) or 2(4), the discharge capacity retention ratio was higher than that in Comparative Examples 2-1 to 2-4. In this case, irrespective of the kind of the compound having a difluoroalkene structure, when the content in the solvent was within a range from 0.01 wt % to 5 wt % both inclusive, a high discharge capacity retention ratio was obtained, and when the content was within a range from 1 wt % to 5 wt % both inclusive, a higher discharge capacity retention ratio was obtained. Moreover, in the case where the solvent included VC or the like, or in the case where the electrolyte salt included the compound represented by Chemical Formula 13(2), a higher discharge capacity retention ratio was obtained.

Therefore, it was confirmed that in the secondary battery according to the embodiment of the invention, in the case where the anode 22 included silicon as the anode active material, when the solvent of the electrolytic solution included the compound having a difluoroalkene structure such as the compound represented by Chemical Formula 1, the cycle characteristics were improved. In particular, it was confirmed that when the content of the compound having a difluoroalkene structure was 0.01 wt % to 5 wt % both inclusive, a sufficient effect was obtained, and when the content was within a range from 1 wt % to 5 wt % both inclusive, a higher effect was obtained. Moreover, it was confirmed that when the solvent included the cyclic carbonate including an unsaturated bond, the chain carbonate represented by Chemical Formula 6 which included a halogen or the cyclic carbonate represented by Chemical Formula 7 which included a halogen, or when the electrolyte salt included the compound represented by Chemical Formula 11 or the like, a higher effect was obtained.

It was confirmed from the results shown in Tables 1 and 2 that in the secondary battery according to the embodiment of the invention, when the solvent of the electrolytic solution included the compound having a difluoroalkene structure, irrespective of the kind of the anode active material, the cycle characteristics were improved.

In this case, compared to the case where a carbon material was used as the anode active material, in the case where silicon was used as the anode active material, the rate of increase of the discharge capacity retention ratio was larger. It was considered that the result was obtained, because when silicon which was advantageous for an increase in capacity was used, compared to the case where the carbon material was used, the electrolytic solution was easily decomposed, so the decomposition inhibition effect of the electrolytic solution was exerted pronouncedly.

In Tables 1 and 2, only the results in the case where the compound represented by Chemical Formula 1 is used as the compound having a difluoroalkene structure are shown; however, even in the case where a compound having a difluoroalkene structure other than the compound represented by Chemical Formula 1 is included in the solvent, the cycle characteristics may be improved in the same manner.

Although the present invention is described referring to the embodiment and the examples, the invention is not limited to the embodiment and the examples, and may be variously modified. For example, the application of the electrolytic solution of the invention is not limited to batteries, and the electrolytic solution may be applied to any other electrochemical devices in addition to the batteries. As the other application, for example, a capacitor or the like is cited.

Moreover, in the above-described embodiment and the above-descried examples, the case where the electrolytic solution or the gel electrolyte in which the polymer compound holds the electrolytic solution is used as the electrolyte of the battery of the invention is described; however, any other kind of electrolyte may be used. Examples of the electrolyte include a mixture of an ion-conducting inorganic compound such as ion-conducting ceramic, ion-conducting glass or ionic crystal and an electrolytic solution, a mixture of another inorganic compound and an electrolytic solution, a mixture of the inorganic compound and a gel electrolyte, and the like.

Moreover, in the above-described embodiment and the above-described examples, as the battery of the invention, a lithium-ion secondary battery in which the capacity of the anode is represented by a capacity component based on insertion and extraction of lithium, and a lithium metal secondary battery in which the capacity of the anode is represented by a capacity component based on precipitation and dissolution of lithium are described; however, the invention is not necessarily limited to them. The battery of the invention is applicable to a secondary battery in which the charge capacity of an anode material capable of inserting and extracting lithium is smaller than the charge capacity of a cathode, thereby the capacity of the anode includes a capacity component by insertion and extraction of lithium and a capacity component by precipitation and dissolution of lithium, and is represented by the sum of them in the same manner.

In the above-described embodiment and the above-described examples, the case where lithium is used as an electrode reactant is described; however, any other Group 1A element in the short form of the periodic table of the elements such as sodium (Na) or potassium (K), a Group 2A element in the short form of the periodic table of the elements such as magnesium or calcium (Ca), or any other light metal such as aluminum may be used. Also in this case, as the anode active material, the anode material described in the above-described embodiment may be used.

Further, in the above-described embodiment and the above-described examples, the case where the battery has a cylindrical type or a laminate film type, and the case where the battery device has a spirally wound configuration are described as examples; however, the battery of the invention is applicable to the case where a battery has any other shape such as a prismatic type, a coin type or a button type or the case where the battery device has any other configuration such as a laminate configuration in the same manner. Further, the invention is applicable to not only the secondary batteries but also other kinds of batteries such as primary batteries.

In the above-described embodiment and the above-described examples, an appropriate range, which is derived from the results of the examples, of the content of the compound having a difluoroalkene structure in the solvent of the electrolytic solution of the invention is described; however, the description does not exclude the possibility that the content is out of the above-described range. More specifically, the above-described appropriate range is a specifically preferable range to obtain the effects of the invention, and as long as the effects of the invention are obtained, the content may be deviated from the above-described range to some extent.

It should be understood by those skilled in the art that various modifications, combinations, sub-combinations and alterations may occur depending on design requirements and other factors insofar as they are within the scope of the appended claims or the equivalents thereof.

What is claimed is:

1. An electrolytic solution comprising:
   a solvent; and
   an electrolyte salt,
   wherein,
   the solvent includes a compound having a difluoroalkene structure represented by Chemical Formula 1:

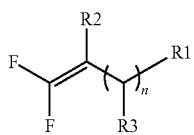

Chemical Formula 1 where R1 represents a group including at least one kind selected from the group consisting of an aryl structure, a cycloalkane structure and a heterocyclic structure, R2 represents a hydrogen group, a fluorine group, an alkyl group having 1 to 3 carbon atoms, an aryl group, a fluorinated alkyl group having 1 to 3 carbon atoms or fluorinated aryl group, R1 and R2 may be bonded to form a cyclic structure, R3 represents a hydrogen group or an alkyl group, and n is an integer of 0 to 4.

2. The electrolytic solution according to claim 1, wherein the content of the compound having a difluoroalkene structure in the solvent is within a range from 1 wt % to 5 wt % both inclusive.

3. The electrolytic solution according to claim 1, wherein the solvent further includes a cyclic carbonate including an unsaturated bond.

4. The electrolytic solution according to claim 1, wherein the solvent further includes at least one kind selected from the group consisting of a chain carbonate represented by Chemical Formula 2 which includes a halogen and a cyclic carbonate represented by Chemical Formula 3 which includes a halogen:

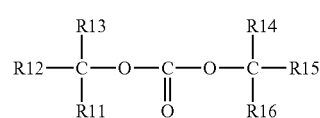

Chemical Formula 2 where R11, R12, R13, R14, R15 and R16 each represent a hydrogen group, a halogen group, an alkyl group or a halogenated alkyl group, and at least one of them is a halogen group or a halogenated alkyl group,

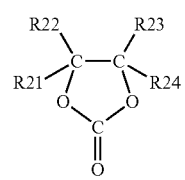

Chemical Formula 3 where R21, R22, R23 and R24 each represent a hydrogen group, a halogen group, an alkyl group or a halogenated alkyl group, and at least one of them is a halogen group or a halogenated alkyl group.

5. The electrolytic solution according to claim 4, wherein:
   the chain carbonate represented by Chemical Formula 2 which includes a halogen includes at least one kind selected from the group consisting of bis(fluoromethyl) carbonate and fluoromethyl methyl carbonate, and
   the cyclic carbonate represented by Chemical Formula 3 which includes a halogen includes at least one kind selected from the group consisting of 4-fluoro-1,3-dioxolane-2-one and 4,5-difluoro-1,3-dioxolane-2-one.

6. The electrolytic solution according to claim 1, wherein the electrolyte salt includes at least one kind selected from the group consisting of lithium hexafluorophosphate ($LiPF_6$), lithium tetrafluoroborate ($LiBF_4$), lithium perchlorate ($LiClO_4$) and lithium hexafluoroarsenate ($LiAsF_6$).

7. The electrolytic solution according to claim 1, wherein the electrolyte salt includes at least one kind selected from the group consisting of compounds represented by Chemical Formulas 4, 5 and 6:

Chemical Formula 4 where m and n each are an integer of 1 or more,

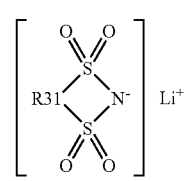

Chemical Formula 5 where R31 represents a straight-chain or branched perfluoroalkylene group having 2 to 4 carbon atoms,

Chemical Formula 6 where p, q and r each are an integer of 1 or more.

8. A battery comprising:
a cathode;
an anode; and an electrolytic solution,
wherein,
the electrolytic solution includes a solvent and an electrolyte salt,
the solvent includes a compound having a difluoroalkene structure, and
the compound having a difluoroalkene structure is represented by Chemical Formula 7:

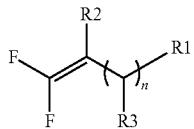

Chemical Formula 7 where R1 represents a group including at least one kind selected from the group consisting of an aryl structure, a cycloalkane structure and a heterocyclic structure, R2 represents a hydrogen group, a fluorine group, an alkyl group having 1 to 3 carbon atoms, an aryl group, a fluorinated alkyl group having 1 to 3 carbon atoms or fluorinated aryl group, R1 and R2 may be bonded to form a cyclic structure, R3 represents a hydrogen group or an alkyl group, and n is an integer of 0 to 4.

9. The battery according to claim 8, wherein the content of the compound having a difluoroalkene structure in the solvent is within a range from 1 wt % to 5 wt % both inclusive.

10. The battery according to claim 8, wherein the solvent further includes a cyclic carbonate including an unsaturated bond.

11. The battery according to claim 8, wherein the solvent further includes at least one kind selected from the group consisting of a chain carbonate represented by Chemical Formula 8 which includes a halogen and a cyclic carbonate represented by Chemical Formula 9 which includes a halogen:

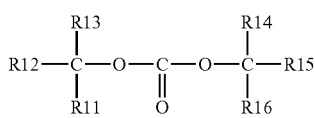

Chemical Formula 8 where R11, R12, R13, R14, R15 and R16 each represent a hydrogen group, a halogen group, an alkyl group or a halogenated alkyl group, and at least one of them is a halogen group or a halogenated alkyl group,

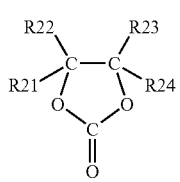

Chemical Formula 9 where R21, R22, R23 and R24 each represent a hydrogen group, a halogen group, an alkyl group or a halogenated alkyl group, and at least one of them is a halogen group or a halogenated alkyl group.

12. The battery according to claim 11, wherein:
the chain carbonate represented by Chemical Formula 8 which includes a halogen includes at least one kind selected from the group consisting of bis(fluoromethyl) carbonate and fluoromethyl methyl carbonate, and
the cyclic carbonate represented by Chemical Formula 9 which includes a halogen includes at least one kind selected from the group consisting of 4-fluoro-1,3-dioxolane-2-one and 4,5-difluoro-1,3-dioxolane-2-one.

13. The battery according to claim 8, wherein the electrolyte salt includes at least one kind selected from the group consisting of lithium hexafluorophosphate, lithium tetrafluoroborate, lithium perchlorate and lithium hexafluoroarsenate.

14. The battery according to claim 8, wherein the electrolyte salt includes at least one kind selected from the group consisting of compounds represented by Chemical Formulas 10, 11 and 12:

$LiN(C_mF_{2m+1}SO_2)(C_nF_{2n+1}SO_2)$    Chemical Formula 10 where m and n each are an integer of 1 or more,

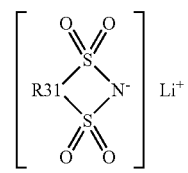

Chemical Formula 11 where R31 represents a straight-chain or branched perfluoroalkylene group having 2 to 4 carbon atoms, $LiC(C_pF_{2p+1}CO_2)(C_qF_{2q+1}SO_2)(C_rF_{2r+1}SO_2)$    Chemical Formula 12 where p, q and r each are an integer of 1 or more.

15. The battery according to claim 8, wherein the cathode includes a cathode active material including a lithium-containing compound capable of inserting and extracting lithium.

16. The battery according to claim 8, wherein the anode includes an anode active material including a carbon material, lithium metal or a material which includes at least one kind selected from the group consisting of silicon (Si) and tin (Sn).

17. The battery according to claim 8, wherein the anode includes an anode active material including a carbon material capable of inserting and extracting lithium.

18. The battery according to claim 17, wherein the carbon material is graphite.

19. The battery according to claim 8, wherein the anode includes an anode active material including at least one kind selected from the group consisting of the simple substance, alloys and compounds of silicon and the simple substance, alloys and compounds of tin.

20. The battery according to claim 8, wherein:
the anode includes an anode current collector and an anode active material layer arranged on the anode current collector, and
the anode active material layer is formed by at least one kind of method selected from the group consisting of a vapor-phase method, a liquid-phase method and a firing method.

* * * * *